United States Patent
Ikemoto et al.

(10) Patent No.: US 9,984,046 B2
(45) Date of Patent: May 29, 2018

(54) FONT DELIVERY SYSTEM AND FONT DELIVERY METHOD

(71) Applicant: MORISAWA Inc., Osaka (JP)

(72) Inventors: Fujio Ikemoto, Osaka (JP); Tsutomu Kubo, Osaka (JP); Takafumi Omuro, Osaka (JP)

(73) Assignee: MORISAWA Inc., Osaka (JP)

(*) Notice: Subject to any disclaimer, the term of this patent is extended or adjusted under 35 U.S.C. 154(b) by 213 days.

(21) Appl. No.: 15/211,620

(22) Filed: Jul. 15, 2016

(65) Prior Publication Data

US 2016/0321217 A1 Nov. 3, 2016

Related U.S. Application Data

(63) Continuation of application No. PCT/JP2015/050121, filed on Jan. 6, 2015.

(30) Foreign Application Priority Data

Jan. 18, 2014 (JP) .................... 2014-007321

(51) Int. Cl.
G06F 17/00 (2006.01)
G06F 17/21 (2006.01)
G06F 21/10 (2013.01)

(52) U.S. Cl.
CPC .......... *G06F 17/214* (2013.01); *G06F 17/218* (2013.01); *G06F 21/10* (2013.01)

(58) Field of Classification Search
CPC .............................. G06F 17/214; G06F 17/21
See application file for complete search history.

(56) References Cited

U.S. PATENT DOCUMENTS 5,819,301 A * 10/1998 Rowe .................... G06F 17/211
715/235
5,860,074 A * 1/1999 Rowe .................... G06F 17/211
707/999.01
(Continued)

FOREIGN PATENT DOCUMENTS

JP 2002-312279 A 10/2002
JP 2007-157036 A 6/2007
(Continued)

OTHER PUBLICATIONS

International Search Report issued in PCT/JP2015/050121 dated Feb. 10, 2015 and translation thereof (4 pages).
(Continued)

*Primary Examiner* — Scott Baderman
*Assistant Examiner* — Benjamin J Smith
(74) *Attorney, Agent, or Firm* — Nakanishi IP Associates, LLC

(57) ABSTRACT

Provided is a font delivery system suppressing an illegal of use the font without sacrificing the time required to display the characters. The font delivery system includes a web server delivering an HTML document, a first delivery font file and a second delivery font file; a document browsing device displaying the HTML document; and a communication line. A browsing control unit of the document browsing device is configured to execute a separation process of separating the first delivery font file into obfuscated information and first divided font data based on keyword information and separating the second delivery font file into salt information and second divided font data; and a combination process of combining the first divided font data and the second divided font data.

9 Claims, 10 Drawing Sheets

(56) References Cited

U.S. PATENT DOCUMENTS

| | | | | |
|---|---|---|---|---|
| 6,065,008 A * | 5/2000 | Simon | G06F 17/214 | |
| 6,073,148 A * | 6/2000 | Rowe | G06F 17/211 | 345/471 |
| 7,064,758 B2 * | 6/2006 | Chik | G06F 17/2229 | 345/467 |
| 7,383,502 B2 * | 6/2008 | Shur | G06F 17/217 | 707/E17.008 |
| 7,492,365 B2 * | 2/2009 | Corbin | G06F 17/214 | 345/467 |
| 7,528,834 B2 * | 5/2009 | Chik | G06F 17/214 | 345/418 |
| 7,580,038 B2 * | 8/2009 | Chik | G06F 17/214 | 345/418 |
| 7,639,257 B2 * | 12/2009 | Renner | G06F 17/214 | 345/467 |
| 7,889,359 B2 * | 2/2011 | Noda | G06F 17/2217 | 199/40 |
| 7,937,658 B1 * | 5/2011 | Lunde | G06F 17/214 | 715/256 |
| 7,941,743 B2 * | 5/2011 | Reddy | G03G 15/5091 | 358/1.15 |
| 7,996,759 B2 * | 8/2011 | Elkady | G06F 17/248 | 707/808 |
| 8,006,176 B2 * | 8/2011 | Reddy | G03G 15/5091 | 358/1.15 |
| 8,122,350 B2 * | 2/2012 | Shur | G06F 17/217 | 715/255 |
| 8,201,077 B2 * | 6/2012 | Reddy | G03G 15/5091 | 358/1.15 |
| 8,373,873 B2 * | 2/2013 | Negishi | G06F 3/121 | 345/471 |
| 8,413,051 B2 * | 4/2013 | Bacus | G06F 17/00 | 715/205 |
| 8,477,345 B2 * | 7/2013 | Endruscheit | G07B 17/00508 | 358/1.15 |
| 8,615,709 B2 * | 12/2013 | Lee | G06F 17/21 | 715/269 |
| 8,683,006 B2 * | 3/2014 | Veen | G06F 17/214 | 709/217 |
| 8,700,682 B2 * | 4/2014 | Tedder | G06F 17/3089 | 707/809 |
| 8,717,596 B2 * | 5/2014 | Cogan | G06F 3/1204 | 345/467 |
| 8,745,488 B1 * | 6/2014 | Wong | G06F 17/24 | 715/221 |
| 8,825,741 B2 * | 9/2014 | Mayer | G06Q 10/08 | 709/203 |
| 8,856,647 B2 * | 10/2014 | Howell | G06F 17/214 | 715/243 |
| 9,330,349 B2 * | 5/2016 | Cogan | G06F 3/1204 | |
| 9,471,755 B2 * | 10/2016 | Demaree | G06F 21/10 | |
| 9,477,836 B1 * | 10/2016 | Ramam | G06F 21/6263 | |
| 9,483,445 B1 * | 11/2016 | Joshi | G06F 17/212 | |
| 2004/0061703 A1 * | 4/2004 | Chik | G06F 17/2229 | 345/467 |
| 2004/0207627 A1 | 10/2004 | Konsella et al. | | |
| 2005/0151981 A1 * | 7/2005 | Levine | G06K 15/00 | 358/1.9 |
| 2005/0210009 A1 * | 9/2005 | Tran | G06Q 10/10 | |
| 2005/0275656 A1 * | 12/2005 | Corbin | G06F 17/214 | 345/467 |
| 2006/0010371 A1 * | 1/2006 | Shur | G06F 17/217 | 715/251 |
| 2006/0059418 A1 * | 3/2006 | Elkady | G06F 17/245 | 715/269 |
| 2006/0171588 A1 * | 8/2006 | Chellapilla | G06K 9/6828 | 382/185 |
| 2007/0055934 A1 * | 3/2007 | Adamson, III | G06F 17/214 | 715/234 |
| 2007/0159646 A1 * | 7/2007 | Adelberg | G06F 17/214 | 358/1.11 |
| 2007/0195349 A1 * | 8/2007 | Noda | G06F 17/212 | 358/1.11 |
| 2008/0168342 A1 * | 7/2008 | Shur | G06F 17/217 | 715/229 |
| 2008/0189600 A1 * | 8/2008 | Lau | G06F 17/227 | 715/235 |
| 2009/0327409 A1 * | 12/2009 | Mayer | G06Q 10/08 | 709/203 |
| 2010/0042915 A1 * | 2/2010 | Ohara | G06F 17/248 | 715/243 |
| 2010/0064176 A1 * | 3/2010 | Negishi | G06F 3/121 | 714/37 |
| 2010/0067041 A1 * | 3/2010 | Endruscheit | G07B 17/00508 | 358/1.15 |
| 2010/0107062 A1 * | 4/2010 | Bacus | G06F 17/212 | 715/269 |
| 2010/0199174 A1 * | 8/2010 | Leonov | G06F 17/214 | 715/255 |
| 2010/0218086 A1 * | 8/2010 | Howell | G06F 17/214 | 715/236 |
| 2011/0075196 A1 * | 3/2011 | Cogan | G06F 3/1204 | 358/1.15 |
| 2011/0090230 A1 * | 4/2011 | Bacus | G06F 17/214 | 345/467 |
| 2011/0093565 A1 * | 4/2011 | Bacus | G06F 17/30905 | 709/219 |
| 2011/0161375 A1 * | 6/2011 | Tedder | G06F 17/3089 | 707/803 |
| 2011/0271180 A1 * | 11/2011 | Lee | G06F 17/21 | 715/269 |
| 2012/0001921 A1 * | 1/2012 | Escher | G06F 17/214 | 345/467 |
| 2012/0001922 A1 * | 1/2012 | Escher | G06F 17/214 | 345/467 |
| 2012/0079374 A1 * | 3/2012 | Gaddis | G06F 17/30905 | 715/269 |
| 2014/0240731 A1 * | 8/2014 | Cogan | G06F 3/1204 | 358/1.9 |
| 2014/0281903 A1 * | 9/2014 | Le Chevalier | G06F 17/30011 | 715/234 |
| 2015/0020212 A1 * | 1/2015 | Demaree | G06F 21/10 | 726/27 |
| 2015/0332493 A1 * | 11/2015 | Adamson, III | G06T 11/60 | 345/471 |
| 2016/0092409 A1 * | 3/2016 | Le Henaff | G06F 17/212 | 715/269 |
| 2017/0154023 A1 * | 6/2017 | Kato | G06F 17/243 | |
| 2017/0301115 A1 * | 10/2017 | Le Henaff | G06T 11/203 | |

FOREIGN PATENT DOCUMENTS

| | | |
|---|---|---|
| JP | 2012-155681 A | 8/2012 |
| WO | 2013-097812 A1 | 7/2013 |

OTHER PUBLICATIONS

Written Opinion of International Searching Authority issued in PCT/JP2015/050121 dated Feb. 10, 2015 (4 pages).

* cited by examiner

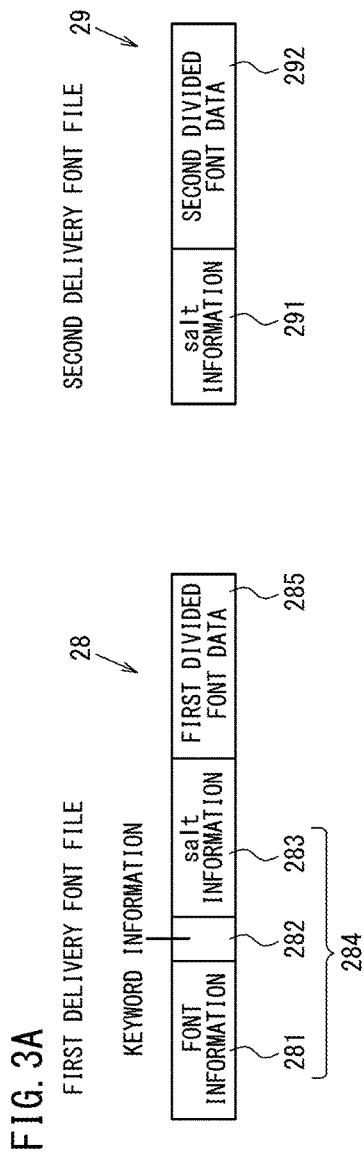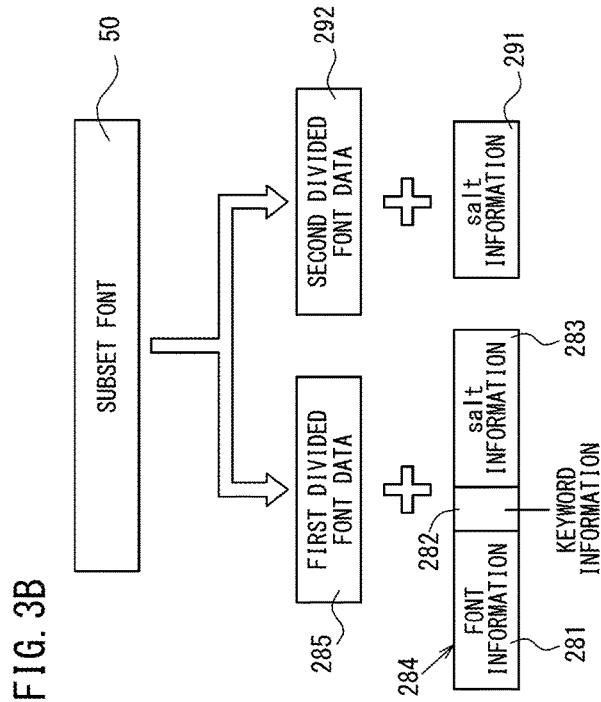
FIG. 3A
FIG. 3B

FIG. 4

| PLAN ID | FONT FAMILY NAME | GLYPH NUMBER | URL | salt | DELIVERY FONT FILE NAME | USE RESTRICTION |
|---|---|---|---|---|---|---|
| 10001 | testfont | 30 | www.test.··· | 13 | e3j98cv01<br>e3j98cv02 | ABSENT |
| 10002 | AAA-font | 25 | www.aa.com/··· | 15 | wv1zep01<br>wv1zep02 | ABSENT |
| 10003 | B-font | 13 | www.bb.com/··· | 11 | rybqzejd01<br>rybqzejd02 | PRESENT |
| ··· | ··· | ··· | ··· | ··· | ··· | ··· |
| 16035 | xxx-font | 7 | www.zzz.net/ | 10 | uynw83x01<br>uynw83x02 | ABSENT |
| 16036 | 777-font | 18 | www.rx.ne.jp/ | 16 | lmr8h4g01<br>lmr8h4g02 | ABSENT |

35, 351, 352, 353, 354, 355, 356, 357 ved by the
FONT DELIVERY SYSTEM AND FONT DELIVERY METHOD

TECHNICAL FIELD

The present invention relates to a font delivery system and a font delivery method for delivering, for example, a font corresponding to a type face name designated by a stylesheet language tab to an HTML document from a web server.

BACKGROUND ART

A document creating person operates a document creation device to create an electronic document by use of a desired font, and the electronic document is displayed on a document browsing device of a document browsing person. In this case, unless the document browsing device has the same font as that of the document creation device, the document browsing device does not display the electronic document with the font desired by the document creating person.

An example of such an electronic document is an HTML document delivered from a web server to a document browsing device via, for example, a communication line to be browsed as a website.

In order to allow the HTML document to be browsed by the document browsing device as being intended by the document creating person, a font delivery system has been proposed. The font delivery system creates and delivers a subset font, which is a group of fonts corresponding to characters extracted from the HTML document, and thus makes the HTML document browsable by the document browsing device with the font intended by the document creating person.

For example, the document browsing device acquires a URL designation file registered in the HTML document. Then, based on character codes and styles registered in the URL designation file, the document browsing device extracts a character string for each of the styles from the HTML document. The document browsing device also requests a font server to deliver a font that the document browsing device does not own, among the fonts corresponding to the extracted styles.

In response to the request from the document browsing device, the font server creates, based on the fonts and the character codes corresponding to each of the styles, a subset font representing a group of fonts extracted from a plurality of fonts stored thereon and delivers the subset font to the document browsing device.

Upon acquisition of the subset font, the document browsing device displays the characters in the HTML document with fonts of the subset font, not with the fonts that are set by the document browsing device. It is described that in this manner, the HTML document is made browsable as being intended by the document creating person (see Patent Document 1).

In addition, recently, the speed of the communication line is increased and the performance of the document browsing device is improved to shorten the time required to acquire the subset font and display the document with a font of the subset font. Thus, a browsing person is allowed to browse a website with an improved level of design with no stress.

When the above-described website formed with the HTML document and a font of the subset font is browsed, the document browsing device stores the subset font on, for example, a cache folder or the like in order to display the HTML document more efficiently in the future.

This provides an undesirable possibility that a browsing person in bad faith easily replicates a font file like the subset file stored on the document browsing device to illegally use the subset font for a use not intended by the document creating person.

CITATION LIST

Patent Literature

[Patent Document 1] Japanese Laid-Open Patent Publication No. 2012-155681

SUMMARY OF INVENTION

Technical Problem

The present invention made in light of the above-described problem has an object of providing a font delivery system and a font delivery method suppressing an illegal use of a font without sacrificing the time required to display the characters.

Solution to Problem

The present invention is directed to a font delivery system, and a font delivery method, including a document delivery device storing a markup document created by use of a markup language and delivering the markup document; a font delivery device storing a delivery font file including a font corresponding to characters in the markup document and delivering the delivery font file; a document browsing device including a document delivery request unit requesting the document delivery device to deliver the markup document, a font delivery request unit requesting the font delivery device to deliver the delivery font file based on the markup document, a storage unit storing the markup document and the delivery font file, and a display unit displaying the markup document; and a communication line connecting the document delivery device, the font delivery device and the document browsing device to each other. The document browsing device includes a browsing control unit making the characters in the markup document browsable with the font and outputting the characters to the display unit. The browsing control unit is configured to execute a separation process of separating a plurality of pieces of the delivery font files into obfuscated information and divided font data based on predetermined information, the plurality of delivery font files including a plurality of pieces of divided font data obtained as a result of division of a font file including the fonts corresponding to the characters in the markup document and also including the obfuscated information obfuscating the divided font data; and a combination process of combining the plurality of pieces of divided font data.

The markup language may be an HTML language, an XHTML language or the like.

The markup document may be, for example, an HTML document, or one document including an HTML document and a stylesheet described in a stylesheet language.

The characters may be, for example, characters representing a body or a title of the HTML document.

The font may be, for example, a character type face formed of a type face such as Ming, Gothic or the like, or a font program usable to reproduce a character with a type face such as Ming, Gothic or the like.

The document delivery device and the font delivery device may be realized by one device or separate devices.

The obfuscated information may be, for example, a random character string, information such as the font family name or the like specifying the font file, or information obtained by obfuscation of such information by a predetermined arithmetic operation method.

The predetermined information may be, for example, information distinguishing the obfuscated information and divided font data from each other, the length of data of the obfuscated information, the font family name specifying the font file, or the like. The predetermined information may be information described in the markup document in advance, information registered in a program delivered to the document browsing device via the communication line, or both of these.

According to the present invention, the illegal of use the font is suppressed without sacrificing the time requiring to display the characters.

Specifically, the font file is delivered as being divided into a plurality of delivery font files. With such an arrangement, the font delivery system and the font delivery method make it difficult for a browsing person in bad faith to specify the font file.

The obfuscated information is added to the divided font data. With such an arrangement, the font delivery system and the font delivery method make it difficult to analyze the delivery font file.

Therefore, even if the delivery font files including the obfuscated information are combined together, the document browsing device does not recognize the combined delivery font files as the font file. Thus, the font delivery system and the font delivery method suppress a browsing person in bad faith from easily replicating the font file.

In addition, the font delivery system and the font delivery method shorten the processing time required until the characters in the markup document are made browsable as compared with the case where, for example, the divided font data is delivered in an encrypted state.

In more detail, for example, in the case where the divided font data is encrypted, the illegal use of the font file by a browsing person in bad faith is suppressed with certainty.

However, for decrypting the encrypted divided font data, the document browsing device needs to execute a process of extracting a decryption key from the encrypted divided font data, a process of decrypting the divided font data based on the decryption key, and a process of combining a plurality of pieces of such divided font data.

In the case where the divided font data is encrypted, there is a problem that the document browsing device requires a longer processing time until the characters in the acquired markup document are made browsable with the font intended by the document creasing person.

By contrast, with the font delivery system and the font delivery method described above, the document browsing device merely needs to execute the separation process of separating the obfuscated information and the divided font data from each other based on the predetermined information, and the combination process of combining a plurality of pieces of such divided font data to allow the delivery font file to be used more efficiently and with a smaller number of steps than in the case where the data is encrypted.

Namely, the font delivery system and the font delivery method shorten the processing time required to display the characters than in the case where the data is encrypted.

Thus, the font delivery system and the font delivery method suppress the illegal of use the font without sacrificing the time required to display the characters.

The font delivery system, or the font delivery method, according to the present invention further includes a font generation device including a font storage unit storing a plurality of the fonts, a font file generation unit generating a font file including the fonts that are extracted from the font storage unit and correspond to character information representing the characters in the markup document and a type face information representing a type face name of the characters in the markup document, and a delivery font file generation unit generating the delivery font file based on the font file, the font generation device being connected with the communication line. The delivery font file generation unit is configured to execute a file division process of dividing the font file by a predetermined number to generate the plurality of pieces of divided font data; and an obfuscation process of adding obfuscated information to the divided font data to generate a plurality of the delivery font files.

With such an arrangement, the font delivery system generates and delivers the plurality of delivery font files suppressing the illegal of use the font without sacrificing the time required to display the characters.

The font delivery system, or the font delivery method, according to the present invention further includes predetermined information delivery device delivering the predetermined information to the document browsing device via the communication line. The font generation device includes an instruction sentence generation unit generating a request instruction sentence requesting delivery of the predetermined information. The document browsing device includes a predetermined information request unit requesting the predetermined information delivery device to deliver the predetermined information based on the request instruction sentence in the markup document having the request instruction sentence registered therein.

The predetermined information delivery device may be, for example, any of the document delivery device, the font delivery device and an authentication device, or a different independent device.

The request instruction sentence may be a character string described in a script language or the like.

With such an arrangement, the font delivery system suppresses the illegal of use the font more certainly and improves the convenience of the document creating person.

This will be described specifically. The font generation device generates the request instruction sentence. Therefore, the font delivery system makes it unnecessary for the document creating person to describe the predetermined information in the markup document, and also makes the registration of the request instruction sentence in the markup document easier. Thus, the font delivery system improves the convenience of the document creating person.

The document browsing device acquires the predetermined information from the predetermined information delivery device. Therefore, the font delivery system prevents a browsing person in bad faith from analyzing the markup document and thus specifying the predetermined information. With such an arrangement, the font delivery system suppresses the browsing person in bad faith from separating the divided font data from the delivery font file and combining a plurality of pieces of such divided font data.

In this manner, the font delivery system suppresses the illegal of use the font more certainly and improves the convenience of the document creating person.

In an embodiment according to the present invention, the obfuscated information in the delivery font file may include registration font information that is registered in the markup document and specifies the font. The browsing control unit of the document browsing device may be configured to execute an addition process of adding a predetermined character string, making the characters in the markup document browsable with the font, to the markup document based on the registration font information.

The registration font information may be, for example, the font family name or the like specifying the font in the HTML document.

The predetermined character string may be a character string obtained by the encode form or the like of the font corresponding to the font family name in the HTML document being designated by, for example, the stylesheet language tag.

According to the present invention, the font delivery system suppresses the illegal use of the font more certainly.

Specifically, the document browsing device is allowed to display the characters in the markup document with the font intended by the document creating person only by adding a predetermined character string to the markup document by execution of the addition process. In other words, the markup document is created and delivered in the state where there is no sufficient information necessary to display the characters in the markup document with the font intended by the document creating person. The document browsing device adds the predetermined character string, and as a result, the markup document obtains the information necessary to display the characters with the font intended by the document creating person.

Therefore, in the case where, for example, the document browsing device adds the predetermined character string to the stylesheet in the HTML document including the stylesheet and the HTML file having the URL of the stylesheet registered therein, even if a browsing person in bad faith analyzes the acquired HTML document, the font delivery system suppresses the predetermined character string added to the stylesheet from being specified.

With such an arrangement, even if a browsing person in bad faith re-generates the font file from the delivery font file, the font delivery system makes it difficult for the characters in the markup document generated by the browsing person in bad faith to be browsable with the font in the replicated font file.

Therefore, the font delivery system suppresses the illegal of use the font more certainly by the addition process of adding the predetermined character string to the markup document.

In an embodiment according to the present invention, the obfuscated information in the delivery font file may include dummy information including a random character string; and obfuscated registration font information obtained as a result of the registration font information being obfuscated by the dummy information. The separation process performed by the document browsing device may separate the plurality of delivery font files into the obfuscated registration font information, the dummy information and the divided font data based on the predetermined information. The browsing control unit of the document browsing device may be configured to execute a restoration process of restoring the separated obfuscated registration font information to the registration font information based on the dummy information.

The obfuscated registration information may be, for example, a value calculated by replacement of the registration font information performed by comparison of the dummy information and the registration font information, simple four arithmetic operations performed on the dummy information and the registration font information, or the like.

According to the present invention, the font delivery system suppresses the illegal use of the font more certainly.

Specifically, the font delivery system obfuscates the registration font information by the dummy information. Namely, the obfuscated information is more difficult to be analyzed, and thus the font delivery system prevents a browsing person in bad faith from extracting the registration font information.

With such an arrangement, even if the obfuscated information and the divided font data are separated from each other, the font delivery system inhibits the predetermined character string from being added to the markup document. Therefore, the font delivery system suppresses a browsing person in bad faith from easily replicating or illegally using the delivery font file.

The font delivery system restores the obfuscated registration font information based on the dummy information. With such an arrangement, the font delivery system makes it unnecessary for the document browsing device to acquire the information necessary to restore the obfuscated registration font information from an external device via the communication line.

In addition, for example, the obfuscated registration font information is generated by simple four arithmetic operations or the like performed on the dummy information and the registration font information. Therefore, the font delivery system suppresses the processing time required to restore the registration font information from being extended. With such an arrangement, the font delivery system does not sacrifice the processing time required to restore the registration font information, unlike in the case where the registration font information is encrypted.

In this manner, the font delivery system obfuscates the obfuscated information at a higher degree, and thus suppresses the illegal of use the font more certainly without sacrificing the processing time required to display the characters.

In an embodiment according to the present invention, the obfuscated information in the delivery font file may include dummy information including a random character string.

According to the present invention, the font delivery system suppresses the illegal of use the font without sacrificing the time requiring to display the characters.

This will be described specifically. The dummy information is included. With such an arrangement, even if the delivery font files are simply combined together, the font delivery system prevents the document browsing device from recognizing the combined delivery font files as the font file. Therefore, even if a browsing person in bad faith combines the replicated delivery font files, use of such combined delivery font files as the font file is suppressed.

In addition, the dummy information is a random character string. With such an arrangement, it is made difficult to specify the structure of the delivery font file. This makes it difficult for a browsing person in bad faith to specify the divided font data from the replicated delivery font file.

Furthermore, the dummy information is separated from the delivery font file based on the predetermined information to extract the divided font data. Therefore, the font delivery system easily makes the characters in the markup document browsable.

In this manner, the font delivery system forms the obfuscated information including the dummy information, and thus suppresses the illegal use of the font without sacrificing the processing time required to display the characters.

In an embodiment according to the present invention, the font delivery system may further include an authentication device including a table storage unit storing a font table having, registered therein, font file information representing the font file, and restriction information representing whether there is a use restriction on the font or not, the font file information and the restriction information being stored in a state of being associated with each other; and a use determination unit determining whether use of the font is permitted or not based on the font table. The authentication device may be connected with the communication line. The use determination unit may be configured to execute a referring process of referring to the restriction information in the font table based on the font file information; and a response process of, in the case where the restriction information indicates that there is no use restriction, transmitting permission information permitting the use of the font to the document browsing device. The browsing control unit of the document browsing device may be configured to execute an inquiry process of inquiring of the authentication device whether there is a use restriction on the font or not based on the font file, and the separation process and the combination process in the case where the permission information is acquired.

The use restriction on the use may be, for example, restriction by the expiration date of the use of the font file, restriction by the effective period of the service, restriction by the number times the markup document was browsed, restriction by the charge payment status for the use, or the like.

The authentication device may be an independent device, or the same device as the font generation device generating the delivery font file.

According to the present invention, the font delivery system suppresses the illegal of use the font by the document creating person.

Specifically, the font delivery system may request the authentication device to make an authentication on the use of the font by the inquiry process performed by the document browsing device.

In the case where the permission information is acquired, the document browsing device separates the divided font data from the delivery font file, and combines a plurality of pieces of such divided font data. Namely, the font delivery system including the authentication device sets a use restriction on the delivery font file.

With such an arrangement, in the case where, for example, the document creating person who has created the markup document does not pay the monthly charge, the font delivery system puts a restriction on the continued use of the font used by the document creating person.

In this manner, the font delivery system sets a use restriction on the delivery font file to suppress the illegal of use the font by the document creating person.

Advantageous Effects of Invention

The present invention provides a font delivery system and a font delivery method suppressing an illegal of use the font without sacrificing the time requiring to display the characters.

BRIEF DESCRIPTION OF DRAWINGS

FIGS. 3A and 3B illustrate delivery font files.
FIG. 4 shows a structure of a registration table.

DESCRIPTION OF EMBODIMENTS

An embodiment of the present invention will be described with reference to the drawings.

First, a font delivery system 1 in this embodiment will be described in detail with reference to FIG. 1 through FIG. 4.

Figure 1:
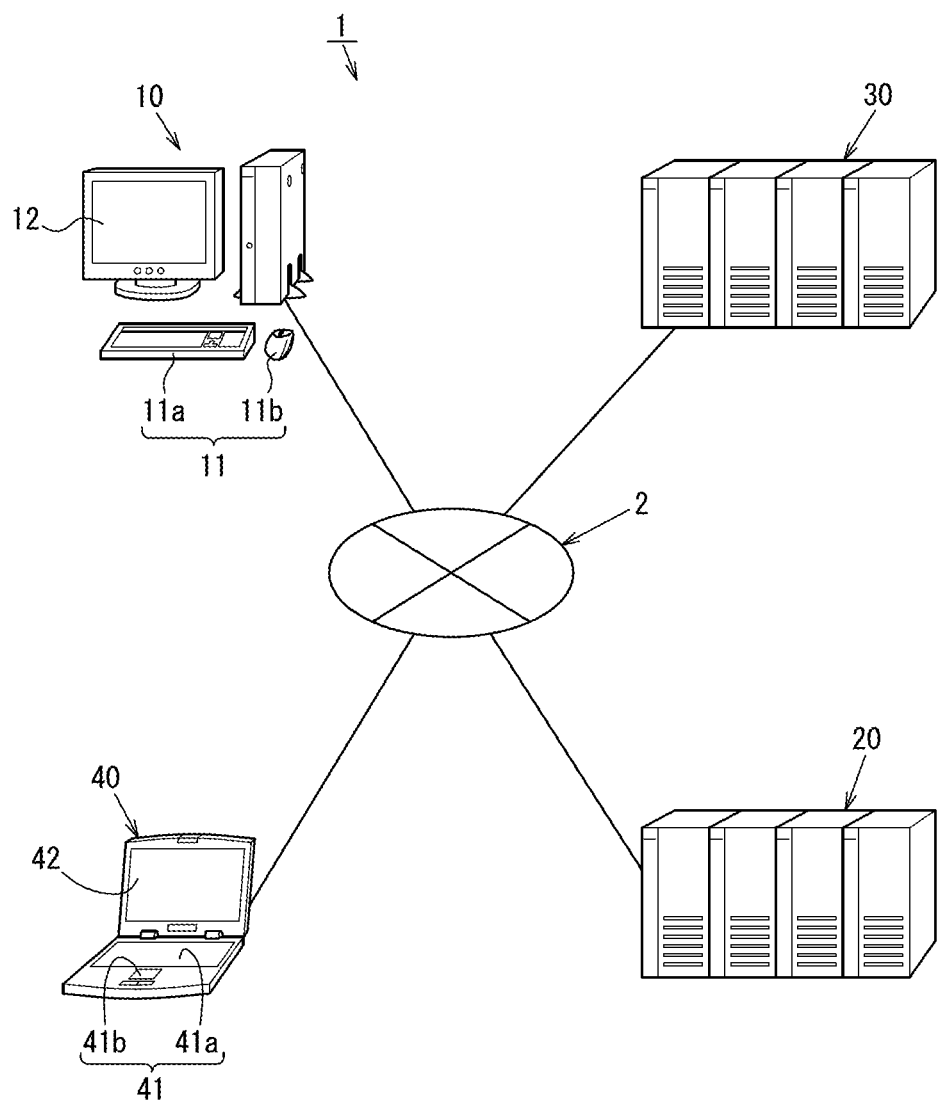
FIG. 1 is a view showing a structure of a font delivery system.
Figure 2:
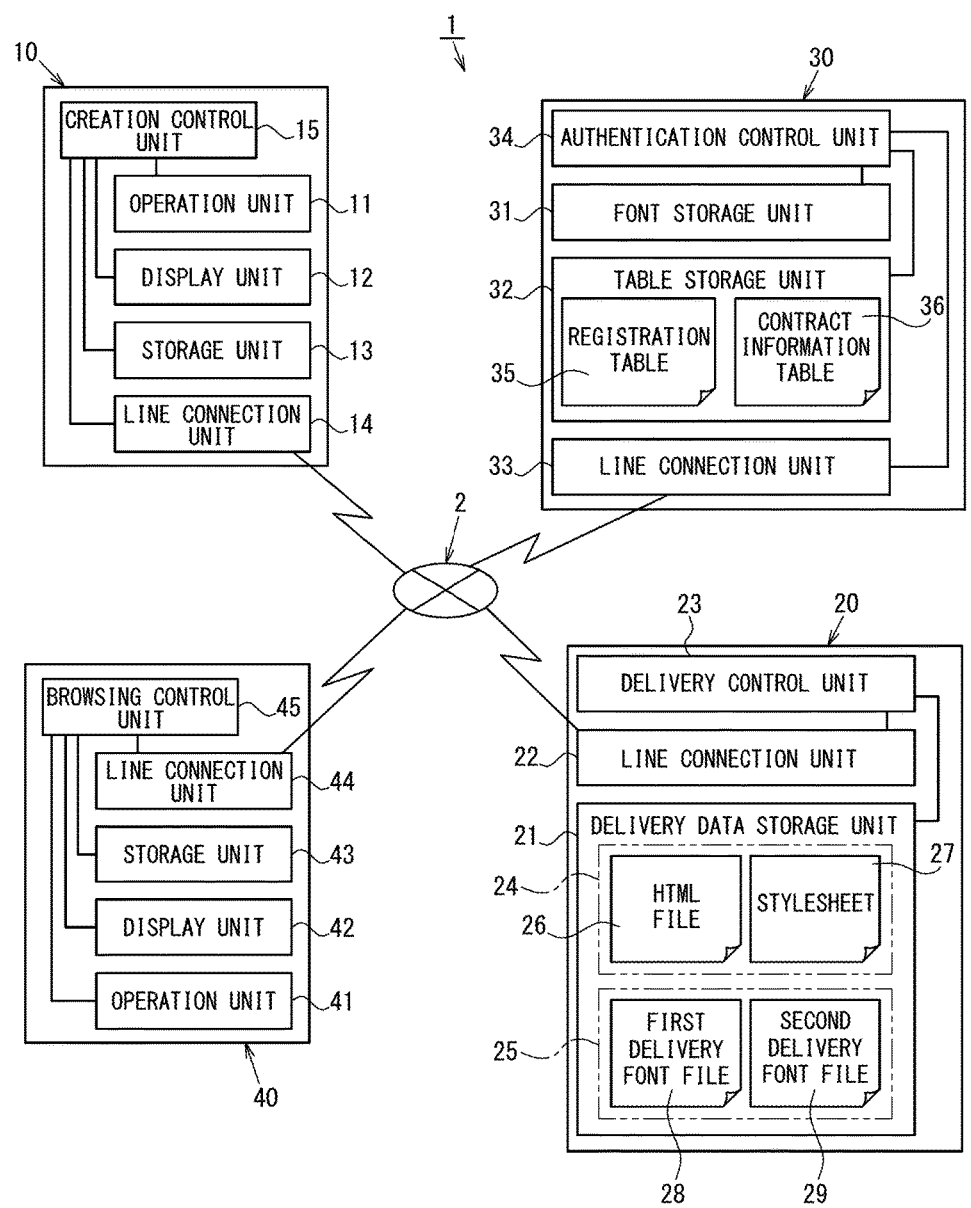
FIG. 2 is a block diagram showing an internal structure of the font delivery system.

FIG. 1 shows a structure of a font delivery system 1. FIG. 2 is a block diagram showing an internal structure of the font delivery system 1. FIGS. 3A and 3B illustrate a delivery font file group 25. FIG. 4 shows a structure of a registration table 35.

As shown in FIG. 1, the font delivery system 1 includes a document creation device 10 usable to, for example, create an HTML document 24 or the like described below, a web server 20 usable to store and deliver the HTML document 24 or the like, an authentication server 30 usable to generate a group of fonts necessary to display the HTML document 24, and a document browsing device 40 usable to browse the HTML document 24. The document creation device 10, the web server 20, the authentication server 30, and the document browsing device 40 are communicably connected with each other via a communication line 2.

The communication line 2 includes a LAN line, a dedicated line, an Internet line or the like.

As shown in FIG. 1 and FIG. 2, the document creation device 10 includes an operation unit 11, a display unit 12, a storage unit 13, a line connection unit 14, and a creation control unit 15.

The operation unit 11 includes, for example, a keyboard 11a and a mouse 11b. The operation unit 11 has a function of receiving an input operation made by a document creating person.

The display unit 12 includes a CRT, a liquid crystal display or the like. The display unit 12 has a function of displaying various types of information.

The storage unit 13 includes a hard disc, a nonvolatile memory or the like. The storage unit 13 has a function of having various types of information written thereon and storing the information and a function of having various types of information read therefrom.

The line connection unit 14 includes a wired LAN card, a wireless LAN device or the like. The line connection unit 14 has a function of being connectable with the communication line 2 and a function of transmitting and receiving various types of information with the web server 20 and the authentication server 30 via the communication line 2.

The creation control unit 15 includes a hardware element such as a CPU, a memory or the like and a software element such as a program, data or the like. The creation control unit 15 has a function of performing various processes including a process regarding the operation made by the document creating person on the document creation device 10 to create the HTML document 24, and a function of controlling an operation of each of the elements of the document creation device 10 connected with each other via a predetermined bus.

As shown in FIG. 2, the web server 20 includes a delivery data storage unit 21, a line connection unit 22, and a delivery control unit 23.

The delivery data storage unit 21 includes a hard disc, a nonvolatile memory or the like. The delivery data storage unit 21 has a function of having various types of information written thereon and storing the information and a function of having various types of information read therefrom.

Stored on the delivery data storage unit 21 are a plurality of HTML documents 24 created by the document creation device 10 and browsable on a web browser (not shown) of the document browsing device 40 described below, and the delivery font file group 25 associated with the HTML documents 24.

The HTML documents 24 each include an HTML file 26 described in an HTML language, a stylesheet 27 associated with the HTML file 26, an image file (not shown), and the like.

The HTML file 26 includes characters representing a title or a body of the HTML document 24, a tag designating a style described in the HTML language, a stylesheet language or the like, a tag reading the stylesheet 27, a tag designating an image, or the like.

In the HTML file 26, a font family name or the like representing a font necessary to reproduce the characters with the type face intended by the document creating person is described with a stylesheet language tag, and a request instruction sentence or the like requesting delivery of an external program is described in the JavaScript (registered trademark).

The stylesheet 27 is an external file that is described in the stylesheet language and is to be read into the web browser by the corresponding tag of the HTML file 26. The stylesheet 27 includes a tag designating the characters, and the style such as the layout or the like, of the HTML file 26.

The delivery font file group 25 includes a first delivery font file 28 and a second delivery font file 29 that are associated with the HTML document 24 and are to be delivered to the document browsing device 40.

The first delivery font file 28 and the second delivery font file 29 are each generated from a subset font 50, which represents a group of fonts formed based on character codes representing the characters and the font family name in the HTML file 26.

In more detail, as shown in FIG. 3A, the first delivery font file 23 includes obfuscated information 284 including font information 281, keyword information 282 and salt information 283, and also includes first divided font data 285.

The font information 281 includes information specifying the subset font 50, for example, information representing the number of glyphs, the font family name or the like. Such information included in the font information 281 is obfuscated by the salt information 283. Generation of the font information 281 will be described below in detail.

The keyword information 282 is information distinguishing the data positions of the font information 281 and the salt information 283 from each other in the obfuscated information 284. The keyword information 282 includes, for example, an appropriate word such as "@webfont" or the like.

The salt information 283 includes a random character string formed of 10 to 16 characters determined by a random number generating function.

The subset font 50 includes fonts that correspond to the character codes representing the characters in the HTML file 26 and are extracted from a type face file corresponding to the font family name designated by the document creating person. As shown in FIG. 3B, the subset font 50 is divided into two parts at an arbitrary position. The first divided font data 285 is one of the divided parts.

As shown in FIG. 3A, the second delivery font file 29 includes salt information 291 and second divided font data 292.

The salt information 291 is the same type of information as the salt information 283 in the first delivery font file 28, and will not be described in detail.

As shown in FIG. 3B, the second divided font data 292 is the other of the two divided parts of the subset font 50.

The line connection unit 22 includes a wired LAN card, a wireless LAN device or the like. The line connection unit 22 has a function of being connectable with the communication line 2 and a function of transmitting and receiving various types of information with the document creation device 10, the authentication server 30 and the document browsing device 40 via the communication line 2.

The delivery control unit 23 includes a hardware element such as a CPU, a memory or the like and a software element such as a program, data or the like. The delivery control unit 23 has a function of performing various processes regarding transfer of various types of information with the document creation device 10, the authentication server 30 and the document browsing device 40, and a function of controlling an operation of each of the elements of the web server 20 connected with each other via a predetermined bus.

As shown in FIG. 2, the authentication server 30 includes a font storage unit 31, a table storage unit 32, a line connection unit 33, and an authentication control unit 34.

The font storage unit 31 includes a hard disc, a nonvolatile memory or the like. The font storage unit 31 has a function of having various types of information written thereon and storing the information and a function of having various types of information read therefrom.

Stored on the font storage unit 31 are type face files such as a "kana" type face file (not shown), which represents a group of fonts for "kana" characters, a "kanji (Chine characters)" type face file (not shown), which represents a group of fonts for "kanji" characters, an English alphabet type face file (not shown), which represents a group of fonts for English alphabets, and a numerical figure type face file (not shown), which represents a group of fonts for numerical figures, and the like. A "font" is a font program usable to reproduce a character with a predetermine size of outline form and a type face such as Ming, Gothic or the like.

The table storage unit 32 includes a hard disc, a nonvolatile memory or the like. The table storage unit 32 has a function of having various types of information written thereon and storing the information and a function of having various types of information read therefrom. Stored on the table storage unit 32 are a registration table 35 having, registered therein, information specifying the delivery font file group 25 or the like, a contract information table 36 specifying the document creating person who uses a service that generates the delivery font file group 25, and the like.

As shown in FIG. 4, the registration table 35 includes a plan ID column 351, a font family name column 352, a glyph number column 353, a URL column 354, a salt column 355, a delivery font file name column 356, and a use restriction column 357. The pieces of information included in the registration table 35 are registered in such columns in association with each other.

Registered in the plan ID column 351 are plan IDs each representing a number specifying the subset font 50 and the delivery font file group 25. The plan ID is set and managed for each of the subset fonts 50 and each of the delivery font file groups 25 generated.

Registered in the font family name column 352 are font family names each designated by the stylesheet language tag included in the HTML file 26.

Registered in the glyph number column 353 are glyph numbers each representing the number of glyphs included in the subset font 50.

Registered in the URL column 354 are URLs of the web servers 20 each needed to browse the HTML document 24 and the delivery font file group 25 by the web browser.

Registered in the salt column 355 are salt character numbers each representing the number of characters in the character strings in the salt information 283 and 291.

Registered in the delivery font file name column 356 are file names of the first delivery font file 28 and the second delivery font file 29 generated based on the HTML document 24.

Registered in the use restriction column 357 is use restriction information regarding whether there is a restriction on the use of the delivery font file group 25 or not. For example, in the case where a charge payment is overdue, use restriction information indicating that "there is a use restriction" is registered in the use restriction column 357.

The contract information table 36 is not shown in detail. Registered in the contract information table 36 are a contracting person ID, which is a unique number specifying each of document creating persons, the name, mail address, credit card information, charge payment state of each document creating person, expiration date of the service, the plan ID, which is a unique number specifying the delivery font file group 25 created by each document creating person, and the like. These types of information are registered in association with each other.

The line connection unit 33 includes a wired LAN card, a wireless LAN device or the like. The line connection unit 33 has a function of being connectable with the communication line 2 and a function of transmitting and receiving various types of information with the document creation device 10, the web server 20 and the document browsing device 40 via the communication line 2.

The authentication control unit 34 includes a hardware element such as a CPU, a memory or the like and a software element such as a program, data and or like. The authentication control unit 34 has a function of performing various processes regarding transfer of various types of information with the document creation device 10, the web server 20 and the document browsing device 40, and a function of controlling an operation of each of the elements of the authentication server 30 connected with each other via a predetermined bus.

As shown in FIG. 1 and FIG. 2, the document browsing device 40 includes an operation unit 41, a display unit 42, a storage unit 43, a line connection unit 44, and a browsing control unit 45.

The operation unit 41 includes a keyboard 41a and a touch pad 41b. The operation unit 41 has a function of receiving an input operation made by the document creating person.

The display unit 42 includes a liquid crystal display. The display unit 42 has a function of displaying various types of information.

The storage unit 43 includes a hard disc, a nonvolatile memory or the like. The storage unit 43 has a function of having various types of information written thereon and storing the information and a function of having various types of information read therefrom.

The line connection unit 44 includes a wired LAN card, a wireless LAN device or the like. The line connection unit 44 has a function of being connectable with the communication line 2 and a function of transmitting and receiving various types of information with the web server 20 and the authentication server 30 via the communication line 2.

The browsing control unit 45 includes a hardware element such as a CPU, a memory or the like and a software element such as a program, data or the like. The browsing control unit 45 has a function of performing various processes regarding transfer of various types of information with the web server 20 and the authentication server 30, and a function of controlling an operation of each of the elements of the document browsing device 40 connected with each other via a predetermined bus.

The font delivery system 1 having the above-described structure generates the delivery font file group 25 based on the HTML document 24 created by the document creating person by an operation on the document creation device 10. An operation of the font delivery system 1 in this process will be described with respect to FIG. 5 and FIG. 6.

Figure 5:
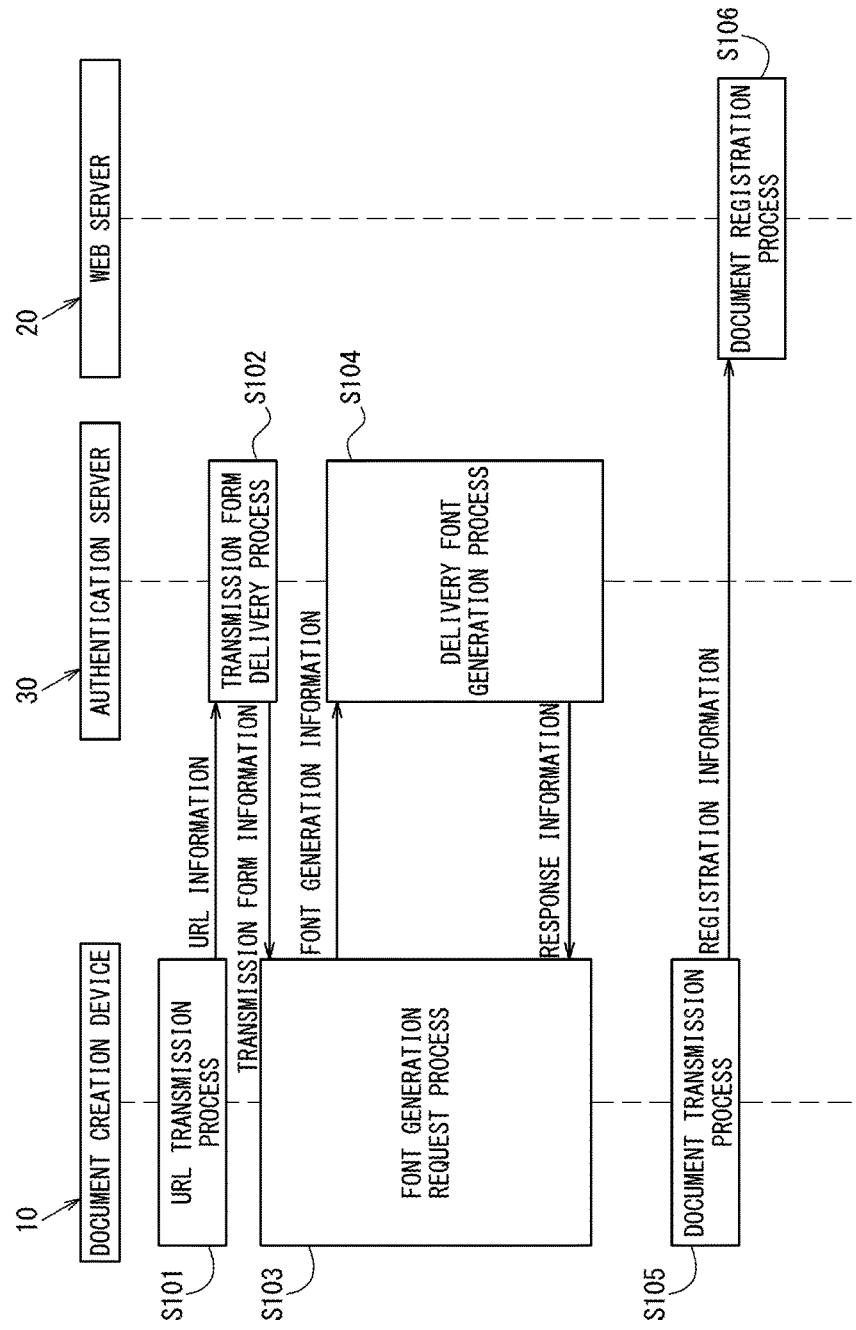
FIG. 5 is a sequence diagram showing transfer of various types of information among a document creation device, an authentication server and a web server.
Figure 6:
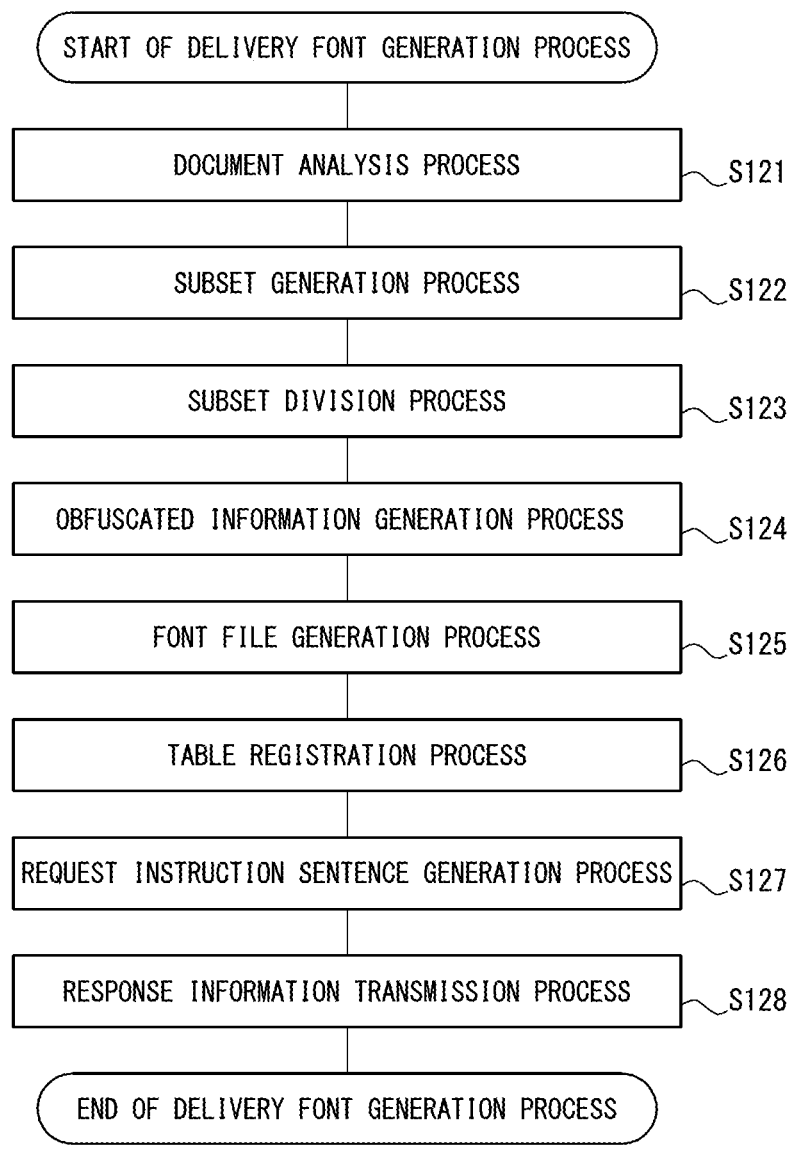
FIG. 6 is a flowchart showing an operation of a delivery font generation process performed by the authentication server.

FIG. 5 is a sequence diagram showing transfer of various types of information among the document creation device 10, the authentication server 30 and the web server 20. FIG. 6 is a flowchart showing an operation of a delivery font generation process performed by the authentication server 30.

First, as shown in FIG. 5, the document creating person who has created the HTML document 24 operates the document creation device 10 to start the web browser (not shown) and inputs an URL, in the URL column of the web browser, usable to retrieve a function of the authentication server 30 of generating a delivery font file. The creation control unit 15 executes a URL transmission process (step S101) to transmit URL information representing the input URL to the authentication server 30. In the HTML file 26 in the HTML document 24, the font family name designating a font needed to reproduce the characters with the type face intended by the document creating person is described by the stylesheet language tag.

Upon acquisition of the URL information by the authentication server 30, the authentication control unit 34 of the authentication server 30 starts a transmission form delivery process (step S102). In detail, the authentication control unit 34 transmits, to the document creation device 10 via the communication line 2, transmission form information representing a transmission form that urges the document creating person to, for example, designate the HTML document 24.

Upon acquisition of the transmission form information by the document creation device 10, the creation control unit 15 of the document creation device 10 temporarily stores the transmission form information on the memory and then starts a font generation request process based on the transmission form information (step S103). In detail, based on the transmission form information, the creation control unit 15 causes a menu screen (not shown), urging input of the contracting person ID, the HTML document 24 and the URL at which the HTML document 24 is to be stored, to be displayed on the web browser.

The document creating person follows the menu screen to input the contracting person ID, the HTML document 24 and the URL for the HTML document 24 and then presses a transmission button. When the transmission button is pressed (or when the press on the transmission button is detected), the creation control unit 15 transmits the contracting person ID, the HTML document 24 and the URL to the authentication server 30 via the communication line 2 as font generation information.

Upon acquisition of the font generation information by the authentication server 30, the authentication control unit 34 of the authentication server 30 starts a delivery font generation process of generating the delivery font file (step S104).

As shown in FIG. 6, upon start of the delivery font generation process, the authentication control unit 34 starts a document analysis process of analyzing the acquired HTML document 24 (step S121). Specifically, the authentication control unit 34 extracts the character codes representing the characters of the title or the body of the HTML document 24 and the font family name from the acquired HTML file 26.

Then, the authentication control unit 34 starts a subset generation process (step S122) to read a type face file corresponding to the acquired font family name from the font storage unit 31 and to extract a font corresponding to the character codes from the read type face file.

The authentication control unit 34 outputs the subset font 50 including the extracted font in association with the character codes. At this point, the authentication control unit 34 calculates the glyph number of the subset font 50 and generates a plan ID corresponding to the subset font 50.

Upon generation of the subset font 50, the authentication control unit 34 starts a subset division process of dividing the subset font 50 (step S123). In this process, the authentication control unit 34 divides the subset font 50 at a predetermined data position to generate the first divided font data 285 and the second divided font data 292.

Upon generation of the first divided font data 285 and the second divided font data 292, the authentication control unit 34 starts an obfuscated information generation process of generating the obfuscated information 284 (step S124). In detail, the authentication control unit 34 generates one random integer value between 10 and 16 by a random function. The integer value is set as the salt character number. The authentication control unit 34 generates a random character string formed of characters of the salt character by the number, and outputs the random character string as the salt information 283 and 291.

The authentication control unit 34 combines the glyph number acquired in the subset generation process and the font family name acquired from the HTML file 26 to generate a combined character string. The authentication control unit 34 replaces the character codes representing the characters in the combined character string with the character codes representing the characters in the salt information 283 on a character-by-character basis by an arithmetic operation using the logical product or the exclusive-or, and outputs the resultant character codes as the font information 281.

Then, the authentication control unit 34 combines the font information 281, the keyword information 282 and the salt information 283 in this order to generate the obfuscated information 284.

Upon generation of the obfuscated information 284, the authentication control unit 34 starts a font file generation process (step 3125). In detail, the authentication control unit 34 combines the obfuscated information 284 and the first divided font data 285 in this order, and outputs the resultant information as the first delivery font file 28.

The authentication control unit 34 combines the salt information 291 and the second divided font data 292 in this order, and outputs the resultant information as the second delivery font file 29. In this process, the authentication control unit 34 converts the file names of the first delivery font file 28 and the second delivery font file 29 into random character strings, which are output.

Upon generation of the first delivery font file 28 and the second delivery font file 29, the authentication control unit 34 starts a table registration process (step S126). In detail, the authentication control unit 34 reads the registration table 35 and the contract information table 36 stored on the table storage unit 32, and registers the various types of information acquired by the above-described processes.

For example, for the registration table 35, the authentication control unit 34 registers the plan ID acquired by the subset generation process in the plan ID column 351, registers the font family name acquired from the HTML file 26 in the font family name column 352, registers the glyph number acquired by the subset generation process in the glyph number column 353, and registers the URL acquired by the font generation information in the URL column 354. The authentication control unit 34 registers the salt character number output by the obfuscated information process in the salt column 355, registers the file names of the first delivery font file 28 and the second delivery font file 29 in the delivery font file name column 356, and registers whether there is a use restriction or not in the use restriction column 357 based on the contract information table 36.

In addition, for the contract information table 36, the authentication control unit 34 registers the contracting person ID acquired from the font generation information and the plan ID acquired by the subset generation process in the state of being associated with each other.

Then, the authentication control unit 34 starts a request instruction sentence generation process of generating a request instruction sentence that requests delivery of a restoration program of restoring the delivery font file group 25 (step S127).

Although not shown in detail, the request instruction sentence is a character string that is registered in association with the plan ID and described in the HTML file 26 to request delivery of the restoration program based on the plan ID, and is generated by the JavaScript.

Upon generation of the request instruction sentence, the authentication control unit 34 starts a response information transmission process (step S128), and transmits the generated first delivery font file 28, second delivery font file 29 and request instruction sentence to the document creation device 10 via the communication line 2 as the response information. Then, the authentication control unit 34 terminates the delivery font generation process.

Returning to FIG. 5, upon acquisition of the response information by the document creation device 10, the creation control unit 15 of the document creation device 10 causes the web browser to display a message urging the document creating person to store the first delivery font file 28 and the second delivery font file 29 on the storage unit 13 and a message urging the document creating person to display the request instruction sentence and add the request instruction sentence to the HTML file 26.

Then, the document creating person operates the document creation device 10 to store the first delivery font file 28 and the second delivery font file 29 on the storage unit 13, and adds the request instruction sentence at a predetermined position in the HTML file 26.

The creation control unit 15 of the document creation device 10 is operated by the document creating person to start a document transmission process of transmitting the HTML document 24 and the delivery font file group 25 to the web server 20 and registering the HTML document 24 and the delivery font file group 25 in the web server 20 (step S105). In this process, the creation control unit 15 transmits the HTML document 24, the first delivery font file 28 and the second delivery font file 29 in the state of being associated with each other to the web server 20 via the communication line 2 as registration information.

Upon acquisition of the HTML document 24, the first delivery font file 28 and the second delivery font file 29 by the web server 20, the delivery control unit 23 of the web server 20 starts a document registration process (step S106) to store the acquired HTML document 24, first delivery font file 28 and second delivery font file 29 on the delivery data storage unit 21.

In this manner, the font delivery system 1 generates the delivery font file group 25 including the first delivery font file 28 and the second delivery font file 29 based on the HTML document 24, and makes the HTML document 24 and the delivery font group 25 deliverable.

Now, an operation of the font delivery system 1 in the case where the document creating person operates the document browsing device 40 to browse the HTML document will be described with respect to FIG. 7 through FIG. 10.

Figure 7:
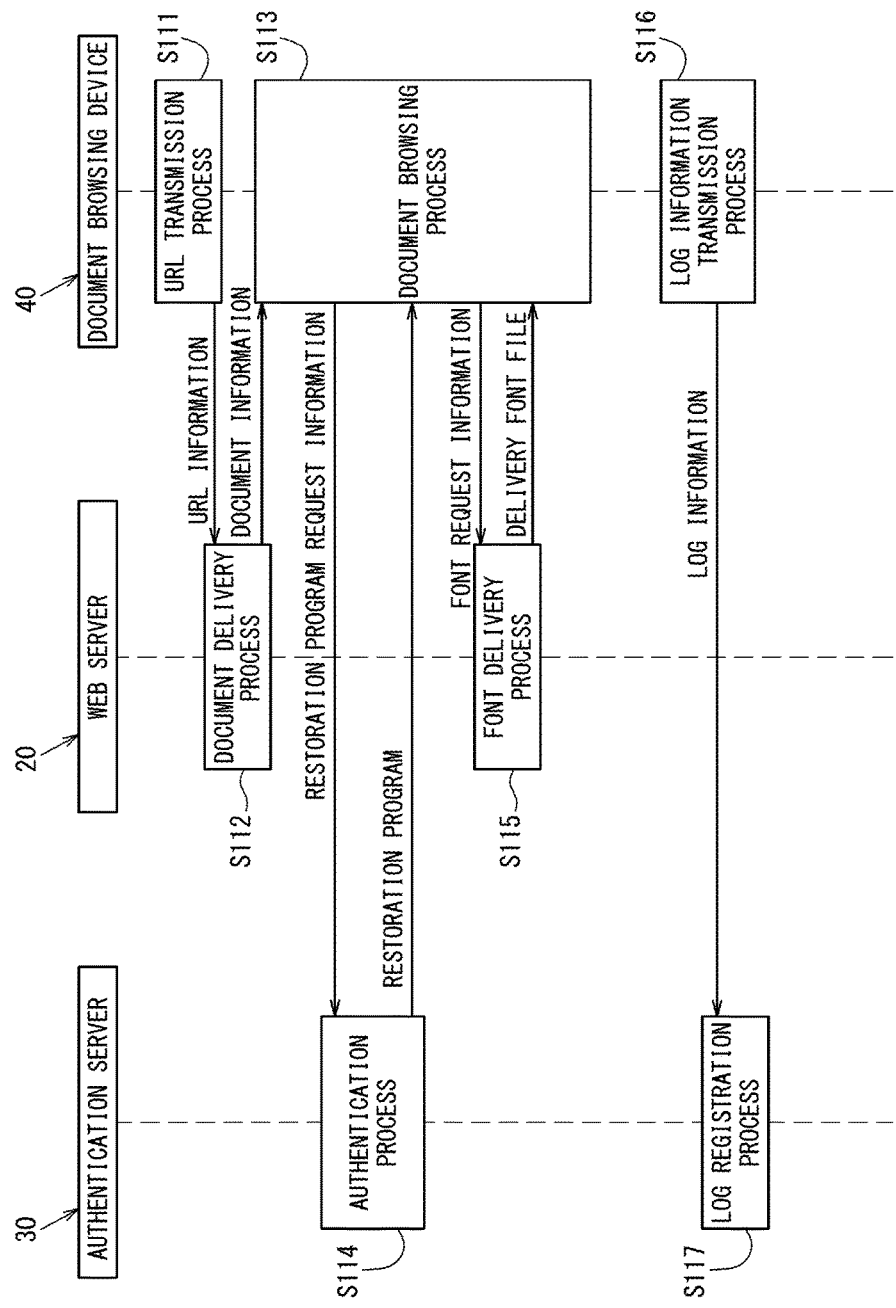
FIG. 7 is a sequence diagram showing transfer of various types of information among the authentication server, the web server and a document browsing device.
Figure 8:
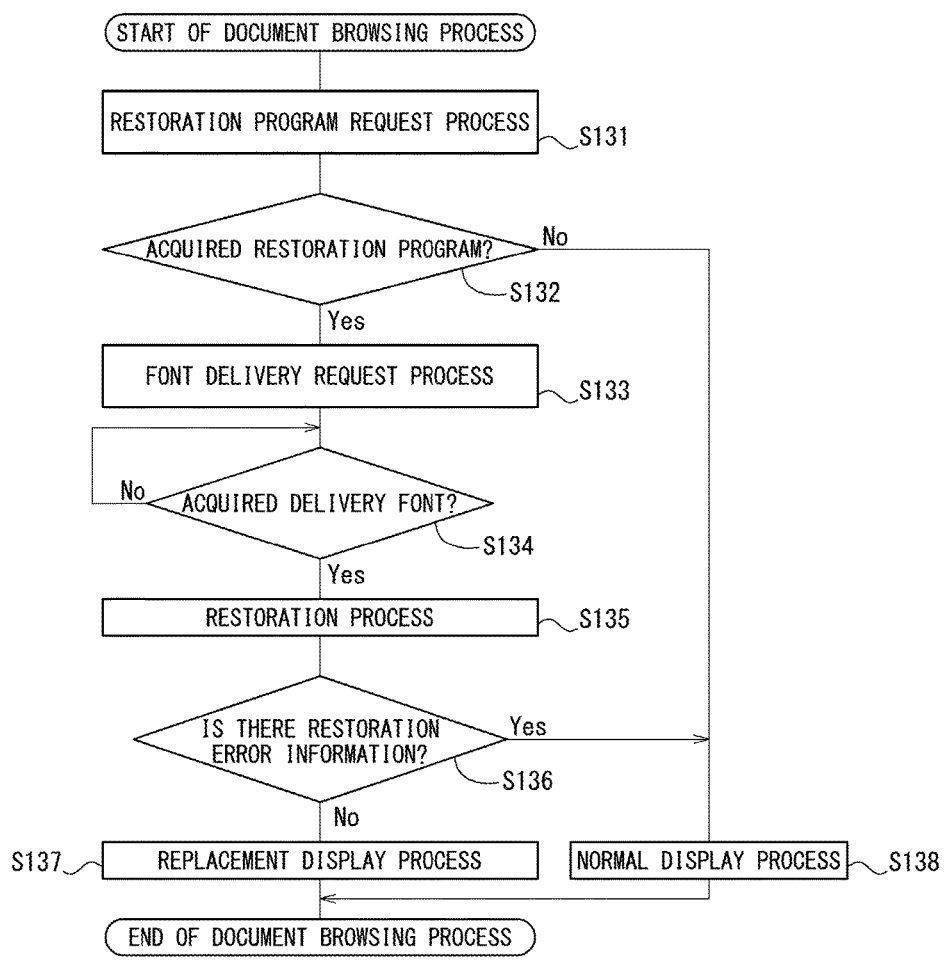
FIG. 8 is a flowchart showing an operation of a document browsing process performed by the document browsing device.
Figure 9:
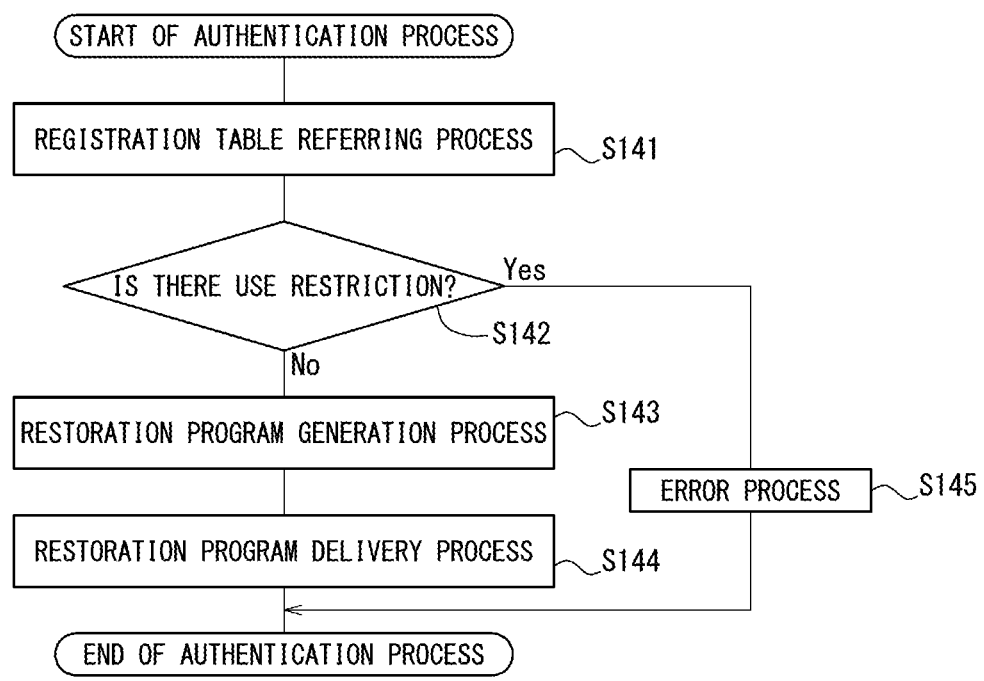
FIG. 9 is a flowchart showing an operation of an authentication process performed by the authentication server.
Figure 10:
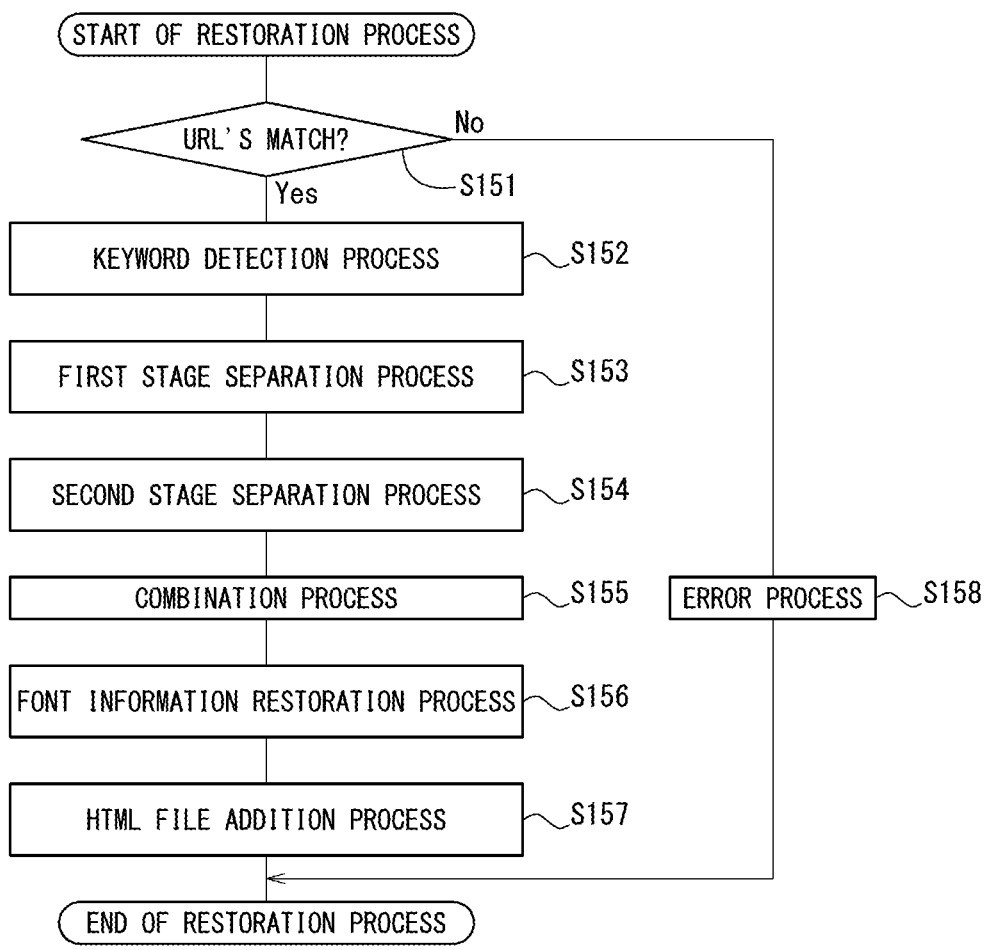
FIG. 10 is a flowchart showing an operation of a restoration process in the document browsing process.

FIG. 7 is a sequence diagram showing transfer of various types of information among the authentication server 30, the web server 20 and the document browsing device 40. FIG. 8 is a flowchart showing an operation of a document browsing process performed by the document browsing device 40. FIG. 9 is a flowchart showing an operation of an authentication process performed by the authentication server 30. FIG. 10 is a flowchart showing an operation of a restoration process in the document browsing process.

First, as shown in FIG. 7, the document creating person who wishes to browse the HTML document 24 operates the document browsing device 40 to start the web browser (not shown) and inputs an URL, in the URL column of the web browser, usable to access the web server 20. Then, the browsing control unit 45 executes a URL transmission process of transmitting the input URL to the web server 20 via the communication line as URL information (step S111).

Upon acquisition of the URL information by the web server 20, the delivery control unit 23 of the web server 20 executes a document delivery process (step S112) to read the HTML document 24 corresponding to the acquired URL information from the delivery data storage unit 21 and transmits the HTML document 24 to the document browsing device 40 via the communication line 2 as document information.

Upon acquisition of the document information by the document browsing device 40, the browsing control unit 45 of the document browsing device 40 stores the document information on the storage unit 43 as the HTML document 24, and executes the document browsing process of analyzing the HTML document 24 and making the HTML document 24 browsable by the web browser (step S113).

As shown in FIG. 8, upon start of the document browsing process, the browsing control unit 45 of the document browsing device 40 starts a restoration program request process of requesting delivery of a restoration program based on the request instruction sentence registered in the HTML file 26 (step S131). In detail, the browsing control unit 45 transmits restoration program request information, acquired from the request instruction sentence and associated with the plan ID, to the authentication server 30 via the communication line 2.

As shown in FIG. 7, upon acquisition of the restoration program request information by the authentication server 30, the authentication control unit 34 of the authentication server 30 starts an authentication process (step S114).

As shown in FIG. 9, upon start of the authentication process, the authentication control unit 34 starts a table referring process (step S141). In detail, the authentication control unit 34 refers to the registration table 35 on the table storage unit 32 to search the plan ID column 351 for a plan ID matching the acquired plan ID.

The authentication control unit 34 reads the salt character number, the URL, the file name, and the use restriction information that are registered in association with the plan ID in the plan ID column 351, respectively from the salt column 355, the URL column 354, the delivery font file name column 356 and the use restriction column 357.

Then, the authentication control unit 34 determines whether there is a use restriction or not on the plan ID (step S142). In the case where there is no use restriction (step S142: No), the authentication control unit 34 starts a restoration program generation process (step S143) to generate a restoration program of causing the document browsing device 40 to acquire and restore the first delivery font file 28 and the second delivery font file 29.

In this process, the authentication control unit 34 associates the salt character number, the URL and the delivery font file name acquired from the registration table 35 with the keyword information to generate the restoration program.

The restoration program is a script code described in, for example, the JavaScript and is a program executable on the web browser.

Upon generation of the restoration program, the authentication control unit 34 starts a restoration program delivery process (step S144) to deliver the generated restoration program to the document browsing device 40 via the communication line 2. Upon delivery of the restoration program, the authentication control unit 34 terminates the authentication process.

In the case where in step S142, there is a use restriction (step S142: Yes), the authentication control unit 34 starts an error process (step S145) and terminates the authentication process without generating the restoration program.

Returning to step S131 in FIG. 8, upon completion of the restoration program request process, the browsing control unit 45 of the document browsing device 40 determines whether the restoration program has been acquired or not (step S132). In the case where the restoration program has been acquired (step S132: Yes), the browsing control unit 45 temporarily stores the restoration program on the memory and then executes the restoration program on the web browser.

Then, the browsing control unit 45 starts a font delivery request process based on the restoration program (step S133). In detail, based on the delivery font file name included in the restoration program, the browsing control unit 45 transmits font request information, requesting delivery of the delivery font file group 25 including the first delivery font file 28 and the second delivery font file 29, to the web server 20 via the communication line 2.

As shown in FIG. 7, upon acquisition of the font request information by the web server 20, the delivery control unit 23 of the web server 20 starts a font delivery process (step S115) to transmit the first delivery font file 28 and the second delivery font file 29 stored on the delivery data storage unit 21 to the document browsing device 40 via the communication line 2 as the delivery font file group 25.

Returning to FIG. 8, upon completion of the font delivery request process, the browsing control unit 45 of the document browsing device 40 determines whether the delivery font file group 25 has been acquired nor not (step S134). In the case where the delivery font file group 25 has not been acquired (step S134: No), the browsing control unit 45 waits for a certain time until acquiring the delivery font file group 25.

By contrast, in the case where the delivery font file group 25 has been acquired (step S134: Yes), the browsing control unit 45 stores the acquired delivery font file group 25, namely, the first delivery font file 28 and the second delivery font file 29, on the storage unit 43.

Then, based on the restoration program, the browsing control unit 45 starts a restoration process of restoring the first delivery font file 28 and the second delivery font file 29 read from the storage unit 43 (step S135).

As shown in FIG. 10, upon start of the restoration process, the browsing control unit 45 determines whether the URL included in the restoration program matches the URL acquired by the web browser or not (step S151).

In the case where the URLs match each other (step S151: Yes), the browsing control unit 45 starts a keyword detection process of searching the first delivery font file 28 to detect the position of the keyword information 282 based on the keyword information included in the restoration program (step S152).

Then, the browsing control unit 45 starts a separation process of separating the first divided font data 285 and the second divided font data 292 respectively from the first delivery font file 28 and the second delivery font file 29.

In more detail, the browsing control unit 45 starts a first stage separation process of separating the font information 281 from the first delivery font file 28 based on the restoration program (step S153). In this process, the browsing control unit 45 separates data located forward to the detected keyword information 282, namely, the font information 281, and also separates the keyword information 282 from the obfuscated information 284. The browsing control unit 45 temporarily stores the separated font information 281 on the memory.

Upon separation of the font information 281 and the keyword information 282, the browsing control unit 45 starts a second stage separation process of separating the salt information 283 and 291 based on the restoration program (step S154).

In detail, the browsing control unit 45 separates data of a length corresponding to the salt character number included in the restoration program as counted from the leading position of the first delivery font file 28, from which the font information 281 and the keyword information 282 have been separated, and thus extracts the first divided font data 285.

The browsing control unit 45 also separates data of a length corresponding to the salt character number included in the restoration program as counted from the leading position of the second delivery font file 29, and thus extracts the second divided font data 292.

Upon completion of the second stage separation process, the browsing control unit 45 starts a combination process based on the restoration program (step S155) and temporarily stores, on the memory, data including the first divided font data 285 and the second divided font data 292 combined together in this order. Namely, the browsing control unit 45 temporarily stores a font acquired by combination of the first divided font data 285 and the second divided font data 292 on the memory.

Upon combination of the first divided font data 285 and the second divided font data 292, the browsing control unit 45 starts a font information restoration process based on the restoration program (step S156). In detail, the browsing control unit 45 perform an arithmetic operation on the salt information 283 and the font information 281 separated from the first delivery font file 28 to restore a combined character string including the glyph number and the font family name combined together.

Upon restoration of the combined character string from the font information 281, the browsing control unit 45 starts an HTML file addition process of adding a predetermined character string to the HTML file 26 based on the restoration program (step S157).

In detail, the browsing control unit 45 specifies the position in the HTML file 26 at which the font family name is described, by use of the font family name acquired from the combined character string. Then, the browsing control unit 45 adds a predetermined character string, necessary to display the characters in the HTML file 26 with the font temporarily stored on the memory, to the position at which the font family name is described, by use of the stylesheet language tag.

For example, the browsing control unit 45 adds an encode form or the like of the font temporarily stored on the memory, at the position in the HTML file 26 at which the font family name is described, by use of the stylesheet language tag. Alternatively, the browsing control unit 45 adds the character string that is necessary to display the characters in the HTML file 26 with the font temporarily stored on the memory but is not currently included in the HTML file 26, at the position in the HTML file 26 at which the font family name is described, by use of the stylesheet language tag.

Upon completion of the HTML file addition process, the browsing control unit 45 terminates the restoration process and returns the procedure to step S135 in FIG. 8.

In the case where in step S151 in FIG. 10, the URLs do not match each other (step S151: No), the browsing control unit 45 starts an error process (step S158) to output restoration error information indicating that the desired font is not acquired, and terminates the restoration process.

Returning to step S135 in FIG. 8, the browsing control unit 45 determines whether the restoration error information has been acquired or not based on the restoration program (step S136). In the case where a restoration error program has not been acquired (step S136: No), the browsing control unit 45 starts a replacement display process (step S137) to reproduce the characters in the HTML file 26 with the font temporarily stored on the memory such that the characters are browsable, and causes the web browser to display the characters. Then, the browsing control unit 45 terminates the document browsing process.

In the case where in step S132 in FIG. 8, the restoration program is not acquired within the certain time (step S132: No) or in the case where in step S136, the restoration error information has been acquired (step S136: Yes), the browsing control unit 45 starts a normal display process (step S138) to make the characters in the HTML file 26 browsable with a font of a substitute font family name described in the HTML file 26 or a font of a type face preset in the web browser, and causes the web browser to display the characters. Then, the browsing control unit 45 terminates the document browsing process.

As shown in FIG. 7, upon display of the HTML document 24 on the web browser, the browsing control unit 45 starts a log information transmission process based on the restoration program (step S116) to transmit log information associated with the plan ID and also the glyph number and the font family name acquired from the combined character string to the authentication server 30 via the communication line 2.

Upon acquisition of the log information by the authentication server 30, the authentication control unit 34 of the authentication server 30 starts a log registration process (step S117) to associate the plan ID, the glyph number and the font family name with each other, and stores the plan ID, the glyph number and the font family name on a predetermined log table (not shown) as a delivery achievement of the delivery font file group 25.

The font delivery system 1 and the font delivery method as described above suppress the illegal of use the font without sacrificing the time required to display the characters.

Specifically, the subset font 50 is delivered as being divided into the first delivery font file 28 and the second delivery font file 29. With such an arrangement, the font delivery system 1 and the font delivery method make it difficult for a browsing person in bad faith to specify the subset font 50.

The obfuscated information 284 is added to the first divided font data 285, and the salt information 291 is added to the second divided font data 292. With such an arrangement, the font delivery system 1 and the font delivery method make it difficult to analyze the first delivery font file 28 and the second delivery font file 29.

Therefore, even if the first delivery font file 28 including the obfuscated information 284 and the second delivery font file 29 including the salt information 291 are combined together, the document browsing device 40 does not recognize the combined first delivery font file 28 and second delivery font file 29 as the subset font 50. Thus, the font delivery system 1 and the font delivery method suppress a browsing person in bad faith from easily replicating the subset font 50.

In addition, the font delivery system 1 and the font delivery method shorten the processing time required until the characters in the HTML document 24 are made browsable as compared with the case where, for example, the first divided font data and the second divided font data are delivered in an encrypted state.

In more detail, for example, for decrypting the encrypted first divided font data and second divided font data, the document browsing device 40 needs to execute a process of extracting a decryption key from the encrypted first divided font data and second divided font data, a process of decrypting the first divided font data and the second divided font data based on the decryption key, and a process of combining the first divided font data and the second divided font data.

In the case where the first divided font data and the second divided font data are encrypted as described above, there is a problem that the document browsing device 40 requires a longer processing time until the characters in the acquired HTML document 24 are made browsable with the font intended by the document creasing person.

By contrast, with the font delivery system 1 and the font delivery method described above, the document browsing device 40 merely needs to execute the separation process and the combination process to temporarily store the first delivery font file 28 and the second delivery font file 29 efficiently and with a smaller number of steps than in the case where the data is encrypted.

Namely, the font delivery system 1 and the font delivery method shorten the processing time required to display the characters than in the case where the data is encrypted.

Thus, the font delivery system 1 and the font delivery method suppress the illegal of use the font without sacrificing the time required to display the characters.

The authentication control unit 34 of the authentication server 30 connected with the communication line 2 is configured to execute the subset division process, the obfuscated information generation process and the font file generation process. With such an arrangement, the font delivery system 1 generates and delivers the first delivery font file 28 and the second delivery font file 29 suppressing the illegal of use the font without sacrificing the processing time required to display the characters.

The browsing control unit 45 of the document browsing device 40 executes the HTML file addition process based on the font family name included in the combined character string restored from the font information 281. With such an arrangement, the font delivery system 1 suppresses the illegal of use the font more certainly.

Specifically, the document browsing device 40 is allowed to display the characters in the HTML document 24 with the font temporarily stored on the memory only by adding a predetermined character string to the HTML document 24 by execution of the HTML file addition process. In other words, the HTML document 24 is created and delivered in the state where there is no sufficient information necessary to display the characters in the HTML document 24 with the font temporarily stored on the memory. The document browsing device 40 adds the predetermined character string, and as a result, the HTML document 24 obtains the information necessary to display the characters in the HTML document 24 with the font temporarily stored on the memory.

With such an arrangement, even if a browsing person in bad faith re-generates the subset font 50 from the first delivery font file 28 and the second delivery font file 29, the font delivery system 1 makes it difficult for the characters in the HTML document 24 generated by the browsing person in bad faith to be browsable with the font in the replicated subset font 50.

Therefore, the font delivery system 1 suppresses the illegal of use the font more certainly by the HTML file addition process of adding the predetermined character string to the HTML document 24.

The document browsing device 40 separates the font information 281, the salt information 283 and the first divided font data 285 from the first delivery font file 28 by the first stage separation process and the second stage separation process, and also restores the font information 281 into the glyph number and the font family name by the font information restoration process. With such an arrangement, the font delivery system 1 suppresses the illegal of use the font more certainly.

Specifically, the font delivery system 1 obfuscates the combined character string including the glyph number and the font family name at a higher degree by the salt information 283. Namely, the obfuscated information 284 is more difficult to be analyzed, and thus the font delivery system 1 prevents a browsing person in bad faith from extracting the glyph number and the font family name.

With such an arrangement, even if the obfuscated information 284 and the first divided font data 285 are separated from each other, the font delivery system 1 inhibits the predetermined character string from being added to the HTML file 26. Therefore, the font delivery system 1 suppresses a browsing person in bad faith from easily replicating or illegally using the delivery font file group 25.

The font delivery system 1 restores the font information 281 based on the salt information 283. With such an arrangement, the font delivery system 1 makes it unnecessary for the document browsing device 40 to acquire the information necessary to restore the font information 281 from an external device via the communication line 2.

In addition, for example, the font delivery system 1 generates the font information 281 by simple four arithmetic operations or the like performed on the salt information 283 and the combined character string to suppress the processing time required to restore the combined character string from being extended. With such an arrangement, the font delivery system 1 does not sacrifice the processing time required to restore the combined character string, unlike in the case where the combined character string is encrypted.

In this manner, the font delivery system 1 obfuscates the obfuscated information 284 at a higher degree, and thus suppresses the illegal of use the font more certainly without sacrificing the processing time required to display the characters.

The font delivery system 1 suppresses the illegal of use the font without sacrificing the processing time required to display the characters, by use of the salt information 291 in the second delivery font file 29.

This will be described specifically. The second delivery font file 29 includes the salt information 291. With such an arrangement, even if the first delivery font file 28 and the second delivery font file 29 are simply combined together, the font delivery system 1 prevents the document browsing device 40 from recognizing the combined first delivery font file 28 and second delivery font file 29 as the subset font 50.

Therefore, even if a browsing person in bad faith combines the replicated first delivery font file 28 and second delivery font file 29, use of such combined first delivery font file 28 and second delivery font file 29 as the subset font 50 is suppressed.

In addition, the salt information 291 is a random character string. With such an arrangement, it is made difficult to specify the structure of the second delivery font file 29. This makes it difficult for a browsing person in bad faith to specify the first divided font data 285 and the second divided font data 292 from the replicated first delivery font file 28 and second delivery font file 29.

Furthermore, the salt information 291 is separated from the second delivery font file 29 based on the salt character number to extract the second divided font data 292. Therefore, the font delivery system 1 easily makes the characters in the HTML document 24 browsable.

Thus, the font delivery system 1 adds the salt information 291 to the second divided font data 292 to suppress the illegal of use the font without sacrificing the processing time required to display the characters.

The authentication control unit 34 of the authentication server 30 is configured to execute the registration table referring process and the restoration program delivery process of transmitting the restoration program to the document browsing device 40 in the case where there is no use restriction. The browsing control unit 45 of the document browsing device 40 is configured to execute the restoration program request process of inquiring of the authentication server 30 whether there is a use restriction on the font or not based on the plan ID. The browsing control unit 45 is also configured to execute the separation process and the combination process in the case where the restoration program has been acquired. With such an arrangement, the font delivery system 1 suppresses the illegal of use the font by the document creating person.

Specifically, in the font delivery system 1, the document browsing device 40 executes the restoration program request process to request the authentication server 30 to make an authentication on the use of a font.

In the case where the restoration program has been acquired, the document browsing device 40 separates the first divided font data 285 and the second divided font data 292 from the first delivery font file 28 and the second delivery font file 29, and combines the first divided font data 285 and the second divided font data 292. Namely, the font delivery system 1 sets a use restriction on the first delivery font file 28 and second delivery font file 29 when the first delivery font file 28 and second delivery font file 29 are delivered.

With such an arrangement, in the case where, for example, the document creating person who has created the HTML document 24 does not pay the monthly charge, the font delivery system 1 puts a restriction on the continued use of the font used by the document creating person.

In this manner, the font delivery system 1 sets a use restriction on the first delivery font file 28 and the second delivery font file 29 to suppress the illegal of use the font by the document creating person.

The authentication control unit 34 of the authentication server 30 generates the request instruction sentence requesting delivery of the restoration program including the keyword information, and the browsing control unit 45 of the document browsing device 40 requests the authentication server 30 to deliver the restoration program based on the request instruction sentence described in the HTML document 24. Thus, the system delivery system 1 suppresses the illegal of use the font more certainly and improves the convenience of the document creating person.

This will be described specifically. The authentication server 30 generates the request instruction sentence. Therefore, the font delivery system 1 makes it unnecessary for the document creating person to describe the keyword information 282 in the HTML document 24, and also makes the registration of the request instruction sentence in the HTML file 26 easier. Thus, the font delivery system 1 improves the convenience of the document creating person.

The document browsing device 40 acquires the keyword information from the authentication server 30. Therefore, the font delivery system 1 prevents a browsing person in bad faith from analyzing the HTML document 24 and thus specifying the keyword information 282. With such an arrangement, the font delivery system 1 suppresses the browsing person in bad faith from separating the first divided font data 285 and the second divided font data 292 from the first delivery font file 28 and the second delivery font file 29 and combining the first divided font data 285 and the second divided font data 292.

In this manner, the font delivery system 1 suppresses the illegal of use the font more certainly and improves the convenience of the document creating person.

The markup document according to the present invention corresponds to the HTML document 24 in the embodiment; and similarly;

the document delivery device corresponds to the web server 20;

the delivery font file corresponds to the first delivery font file 28 or the second delivery font file;

the font delivery device corresponds to the web server 20;

the document delivery request unit, the font delivery request unit, and the browsing control unit each correspond to the browsing control unit 45;

the storage unit corresponds to the storage unit 43;

the display unit corresponds to the display unit 42;

the font file corresponds to the subset font 50;

the divided font data corresponds to the first divided font data 285 or the second divided font data 292;

the obfuscated information corresponds to the obfuscated information 184 or the salt information 291;

the predetermined information corresponds to the keyword information or the salt character number included in the restoration program;

the separation process corresponds to steps S152 through S154;

the combination process corresponds to step S155;

the font storage unit corresponds to the font storage unit 31;

the character information corresponds to the character code;

the type face information corresponds to the font family name;

the font file generation unit and the delivery font file generation unit each correspond to the authentication control unit 34;

the font generation device corresponds to the authentication server 30;

the file division process corresponds to step S123;

the obfuscation process corresponds to steps S124 and S125;

the registration font information corresponds to the combined character string including the glyph number and the font family name;

the addition process corresponds to step S157;

the dummy information corresponds to the salt information 283 or 291;

the obfuscated registration font information corresponds to the font information 281;

the restoration process corresponds to step S156;

the font file information corresponds to the plan ID;

the restriction information corresponds to the use restriction information;

the font table corresponds to the registration table 35;

the table storage unit corresponds to the table storage unit 32;

the use determination unit corresponds to the authentication control unit 34;

the authentication device corresponds to the authentication server 30;

the referring process corresponds to step S141;

the permission information corresponds to the restoration program;

the response process corresponds to steps S143 and S144;

the inquiry process corresponds to step S131;

the predetermined information delivery device corresponds to the authentication server 30;

the instruction sentence generation unit corresponds to the authentication control unit 34; and the predetermined information request unit corresponds to the browsing control unit 45.

The present invention is not limited to the above-described embodiment, and may be carried out in any of various embodiments.

For example, the web server 20 is described as delivering the HTML document 24 and the delivery font file group 25. The present invention is not limited to this. A server delivering the HTML document 24 and a server delivering the delivery font file group 25 may be separately provided.

The font is described as being a font program. The present invention is not limited to this. The font may be a character type face formed of a type face such as Ming, Gothic or the like.

The HTML document 24 is described as being designated and transmitted to the authentication server 30 by the document creating person following the menu screen. The present invention is not limited to this. For example, one compression file including the HTML file 26 and the stylesheet 27 in a compressed manner may be transmitted to the authentication server 30.

The first delivery font file 28 and the second delivery font file 29 are described as being generated from the subset file 50. The present invention is not limited to this. The first delivery font file and the second delivery font file may be generated from a type face file such as a "kana" type face file or the like.

The subset file 50 is described as being divided into two parts. The present invention is not limited to this. The subset file 50 may be divided into an appropriate number of parts.

The obfuscated information 284 is described as being added to the first divided font data 285, and the salt information 291 is described as being added to the second divided font data 292. The present invention is not limited to this. The salt information 291 may be added to the first divided font data 285, and the obfuscated information 284 may be added to the second divided font data 292. Alternatively, the obfuscated information 284 may be added to each of the first divided font data 285 and the second divided font data 292. Still alternatively, the salt information 291 may be added to each of the first divided font data 285 and the second divided font data 292.

The obfuscated information 284 is described as including the font information 281, the keyword information 282 and the salt information 283 in this order. The present invention is not limited to this. The font information 281, the keyword information 282 and the salt information 283 may be included in any other appropriate order.

The combined character string including the glyph number and the font family name is described as being obfuscated by the salt information 283 to form the obfuscated information 284. The present invention is not limited to this. Only the salt information 283, or only the combined character string and the salt information 283, may be used. Alternatively, any appropriate information specifying the subset font 50, for example, the font family name, may be used instead of the combined character string.

The font information 281 and the salt information 283 are described as being distinguished from each other by the keyword information 282. The present invention is not limited to this. The font information 281 and the salt information 283 may be distinguished from each other by the length of data as counted from the leading position of the obfuscated information 284. In this case, the restoration program includes information representing the length of data of the font information 281 and information representing the length of data of the salt information 283.

The restoration program is described as being transmitted in the state of including the keyword information. The present invention is not limited to this. The keyword information may be described in the HTML file 26 or the stylesheet 27 in advance.

The authentication server 30 is described as generating the delivery font file group 25 and delivering the restoration program in the case where there is no use restriction. The present invention is not limited to this. A server generating the delivery font file group 25 and a server delivering the restoration program may be separately provided.

The document browsing device 40 is described as being configured to request the authentication server 30 to deliver the restoration program based on the request instruction sentence in the HTML file 26, and to acquire the delivery font file group 25 based on the acquired restoration program. The authentication server 30 is described as being configured to, in the case where there is no use restriction, deliver the restoration program to the document browsing device 40. The present invention is not limited to this. The document browsing device 40 may be configured to, after acquiring the delivery font file group 25 based on the HTML file 26, request the authentication server 30 to deliver the restoration program based on the request instruction sentence. The authentication server 30 may be configured to, in the case where there is no use restriction, deliver the restoration program to the document browsing device 40.

Alternatively, the document browsing device 40 may be configured to, after acquiring the restoration program and the delivery font file group 25 based on the HTML file 26, inquire of the authentication server 30 whether there is a use restriction on the font or not based on the restoration program, and to, in the case where there is no use restriction, execute the first stage separation process, the second stage separation process and the combination process.

The restoration program including the keyword information is described as being delivered from the authentic server 30. The present invention is not limited to this. A description corresponding the restoration program may be included in the HTML document 24.

Alternatively, the restoration program including the keyword information may be delivered from the web server 20. In this case, for example, a company wishing to generate a restoration program or perform maintenance by its own server is satisfied easily.

The process of separating the first divided font data 285 and the second divided font data 292 from the first delivery font file 28 and the second delivery font file 29 is described as being performed by the first stage separation process of separating the font information 281 from the first delivery font file 28 and the second stage separation process of separating the salt information 283 and 291 from the first delivery font file 28. The present invention is not limited to this. The process may be performed by a first stage separation process of separating the obfuscated information 284 from the first delivery font file 28 and separating the salt information 291 from the second delivery font file 29, and a second stage separation process of separating the obfuscated information 284 into the font information 281, the keyword information 282 and the salt information 283.

The document browsing device 40 is described as storing the first delivery font file 28 and the second delivery font file 29, acquired from the web server 20, on the storage unit 43. The present invention is not limited to this. The document browsing device 40 may temporarily store the acquired first delivery font file 28 and second delivery font file 29 on the memory. The first delivery font file 28 and the second delivery font file 29 stored on the document browsing device 40 may be deleted when the browsing person operates the document browsing device 40 to finish browsing the HTML document 24.

The first divided font data 285 and the second divided font data 292 are described as being stored on the memory in a combined state. The present invention is not limited to this. The first divided font data 285 and the second divided font data 292 may be combined to re-generate one font file, namely, the subset font 50, and may be stored on the storage unit 43 of the document browsing device 40 or may be temporarily stored on the memory.

In the HTML file addition process, a predetermined character string is described as being added to the HTML file 26. The present invention is not limited to this. The predetermined character string may be added to the stylesheet 27. In this case, even if a browsing person in bad faith analyzes the acquired HTML file 26, the font delivery system 1 suppresses the predetermined character string added to the stylesheet 27 from being specified.

As an example of the case where the use of the delivery font file group 25 is restricted, a case where a charge payment is overdue is provided. The present invention is not limited to this. For example, in the case where the effective period of the service has been expired, use restriction information indicating that "there is a use restriction" may be registered in the use restriction column 357.

Alternatively, in the case where the number of times the HTML document 24 was browsed has exceeded a predetermined number of times, use restriction information indicating that "there is a use restriction" may be registered in the use restriction column 357. In this case, in the log registration process (step S117) in FIG. 7, the number of times the log information was acquired is stored for each plan ID as the number of times the HTML document 24 was browsed. In this manner, the charge for use and the use restriction may be set easily in accordance with the number of times of browsing.

REFERENCE SIGNS LIST

1 . . . Font delivery system
2 . . . Communication line
20 . . . Web server
24 . . . HTML document
28 . . . First delivery font file
29 . . . Second delivery font file
30 . . . Authentication server
31 . . . Font storage unit
32 . . . Table storage unit
34 . . . Authentication control unit
35 . . . Registration table
40 . . . Document browsing device
42 . . . Display unit
43 . . . Storage unit
45 . . . Browsing control unit
50 . . . Subset font
281 . . . Font information
284 . . . Obfuscation information
285 . . . First divided font data
291 . . . salt information
292 . . . Second divided font data

The invention claimed is:

1. A font delivery system, comprising:
at least one processor;
a document delivery device storing a markup document created by use of a markup language and delivering the markup document;
a font delivery device storing a delivery font file including a font corresponding to characters in the markup document and delivering the delivery font file;
a document browsing device including a document delivery request unit requesting the document delivery device to deliver the markup document, a font delivery request unit requesting the font delivery device to deliver the delivery font file based on the markup document, a storage unit storing the markup document and the delivery font file, and a display unit displaying the markup document;
a communication line connecting the document delivery device, the font delivery device and the document browsing device to each other;
a font generation device including a font storage unit storing a plurality of the fonts, a font file generation unit generating a font file including the fonts that are extracted from the font storage unit and correspond to character information representing the characters in the markup document and a type face information representing a type face name of the characters in the markup document, and a delivery font file generation unit generating the delivery font file based on the font file, the font generation device being connected with the communication line; and
a predetermined information delivery device delivering predetermined information to the document browsing device via the communication line;
wherein:
the delivery font file generation unit of the font generation device executes:
a file division process of dividing the font file by a predetermined number to generate a plurality of pieces of divided font data; and
an obfuscation process of adding obfuscated information, obfuscating the divided font data, to the divided font data to generate a plurality of the delivery font files;
a browsing control unit of the document browsing device making the characters in the markup document browsable with the font and outputting the characters to the display unit executes:
a separation process of separating the plurality of pieces of delivery font files into the obfuscated information and the divided font data based on the predetermined information; and
a combination process of combining the plurality of pieces of divided font data;
the font generation device includes an instruction sentence generation unit generating a request instruction sentence requesting delivery of the predetermined information; and
the document browsing device includes a predetermined information request unit requesting the predetermined information delivery device to deliver the predetermined information based on the request instruction sentence in the markup document having the request instruction sentence registered therein,
wherein the obfuscated information in the delivery font file includes registration font information that is registered in the markup document and specifies the font;
wherein the browsing control unit of the document browsing device executes an addition process of adding a predetermined character string, making the characters in the markup document browsable with the font, to the markup document based on the registration font information;
wherein the obfuscated information in the delivery font file includes
dummy information including a random character string, and
obfuscated registration font information obtained as a result of the registration font information being obfuscated by the dummy information;

wherein the separation process performed by the document browsing device separates the plurality of delivery font files into the obfuscated registration font information, the dummy information and the divided font data based on the predetermined information; and
wherein the browsing control unit of the document browsing device executes restoration process of restoring the separated obfuscated registration font information to the registration font information based on the dummy information.

2. A font delivery system according to claim 1, wherein the obfuscated information in the delivery font file includes dummy information including a random character string.

3. A font delivery system according to claim 1, further comprising an authentication device including:
a table storage unit storing a font table having, registered therein, font file information representing the font file, and restriction information representing whether there is a use restriction on the font or not, the font file information and the restriction information being stored in a state of being associated with each other; and
a use determination unit determining whether use of the font is permitted or not based on the font table;
wherein:
the authentication device is connected with the communication line;
the use determination unit executes:
a referring process of referring to the restriction information in the font table based on the font file information; and
a response process of, in the case where the restriction information indicates that there is no use restriction, transmitting permission information permitting the use of the font to the document browsing device; and
the browsing control unit of the document browsing device executes:
an inquiry process of inquiring of the authentication device whether there is a use restriction on the font or not based on the font file, and
the separation process and the combination process in the case where the permission information is acquired.

4. A font delivery method performed by use of a system comprising:
a document delivery device storing a markup document created by use of a markup language and delivering the markup document;
a font delivery device storing a delivery font file including a font corresponding to characters in the markup document and delivering the delivery font file;
a document browsing device including a document delivery request unit requesting the document delivery device to deliver the markup document, a font delivery request unit requesting the font delivery device to deliver the delivery font file based on the markup document, a storage unit storing the markup document and the delivery font file, and a display unit displaying the markup document; and
a communication line connecting the document delivery device, the font delivery device and the document browsing device to each other;
wherein:
a font generation device includes a font storage unit storing a plurality of the fonts, a font file generation unit generating a font file including the fonts that are extracted from the font storage unit and correspond to character information representing the characters in the markup document and a type face information representing a type face name of the characters in the markup document, and a delivery font file generation unit generating the delivery font file based on the font file, the font generation device being connected with the communication line, the delivery font file generation unit:
  divides the font file by a predetermined number to generate a plurality of pieces of divided font data; and adds obfuscated information, obfuscating the divided font data, to the divided font data to generate a plurality of the delivery font files; and
an instruction generation unit of the font generation device generates a request instruction sentence requesting delivery of predetermined information;
a predetermined information request unit of the document browsing device requests a predetermined information delivery device, delivering the predetermined information via the communication line, to deliver the predetermined information based on the request instruction sentence in the markup document having the request instruction sentence registered therein; and
a browsing control unit of the document browsing device:
  separates the plurality of delivery font files into the obfuscated information and the divided font data based on the predetermined information;
  combines the plurality of pieces of divided font data, obtained as a result of the separation, to acquire the font; and
  makes the characters in the markup document browsable with the acquired font and outputs the characters to the display unit,
wherein the obfuscated information in the delivery font file includes registration font information that is registered in the markup document and specifies the font;
wherein the browsing control unit of the document browsing device executes an addition process of adding a predetermined character string, making the characters in the markup document browsable with the font, to the markup document based on the registration font information;
wherein the obfuscated information in the delivery font file includes
  dummy information including a random character string, and
  obfuscated registration font information obtained as a result of the registration font information being obfuscated by the dummy information;
wherein the separation process performed by the document browsing device separates the plurality of delivery font files into the obfuscated registration font information, the dummy information and the divided font data based on the predetermined information; and
wherein the browsing control unit of the document browsing device executes restoration process of restoring the separated obfuscated registration font information to the registration font information based on the dummy information.

5. The font delivery method according to claim 4, wherein the obfuscated information in the delivery font file includes dummy information including a random character string.

6. The font delivery method according to claim 4, wherein the system further comprises an authentication device including:
  a table storage unit storing a font table having, registered therein, font file information representing the font file, and restriction information representing whether there is a use restriction on the font or not, the font file information and the restriction information being stored in a state of being associated with each other; and
  a use determination unit determining whether use of the font is permitted or not based on the font table;
wherein:
the authentication device is connected with the communication line;
the use determination unit executes:
  a referring process of referring to the restriction information in the font table based on the font file information; and
  a response process of, in the case where the restriction information indicates that there is no use restriction, transmitting permission information permitting the use of the font to the document browsing device; and
the browsing control unit of the document browsing device executes:
  an inquiry process of inquiring of the authentication device whether there is a use restriction on the font or not based on the font file, and
  the separation process and the combination process in the case where the permission information is acquired.

7. A non-transitory computer readable storage medium storing a computer program for causing a computer to execute a font delivery method performed by use of a system, the system comprising:
  a document delivery device storing a markup document created by use of a markup language and delivering the markup document;
  a font delivery device storing a delivery font file including a font corresponding to characters in the markup document and delivering the delivery font file;
  a document browsing device including a document delivery request unit requesting the document delivery device to deliver the markup document, a font delivery request unit requesting the font delivery device to deliver the delivery font file based on the markup document, a storage unit storing the markup document and the delivery font file, and a display unit displaying the markup document; and
  a communication line connecting the document delivery device, the font delivery device and the document browsing device to each other;
wherein:
a font generation device includes a font storage unit storing a plurality of the fonts, a font file generation unit generating a font file including the fonts that are extracted from the font storage unit and correspond to character information representing the characters in the markup document and a type face information representing a type face name of the characters in the markup document, and a delivery font file generation unit generating the delivery font file based on the font file, the font generation device being connected with the communication line, the delivery font file generation unit:
  divides the font file by a predetermined number to generate a plurality of pieces of divided font data; and adds obfuscated information, obfuscating the divided font data, to the divided font data to generate a plurality of the delivery font files; and an instruction generation unit of the font generation device generates a request instruction sentence requesting delivery of predetermined information;
a predetermined information request unit of the document browsing device requests a predetermined information delivery device, delivering the predetermined information via the communication line, to deliver the predetermined information based on the request instruction sentence in the markup document having the request instruction sentence registered therein; and
a browsing control unit of the document browsing device:
separates the plurality of delivery font files into the obfuscated information and the divided font data based on the predetermined information;
combines the plurality of pieces of divided font data, obtained as a result of the separation, to acquire the font; and
makes the characters in the markup document browsable with the acquired font and outputs the characters to the display unit,
wherein the obfuscated information in the delivery font file includes registration font information that is registered in the markup document and specifies the font;
wherein the browsing control unit of the document browsing device executes an addition process of adding a predetermined character string, making the characters in the markup document browsable with the font, to the markup document based on the registration font information;
wherein the obfuscated information in the delivery font file includes
dummy information including a random character string, and
obfuscated registration font information obtained as a result of the registration font information being obfuscated by the dummy information;
wherein the separation process performed by the document browsing device separates the plurality of delivery font files into the obfuscated registration font information, the dummy information and the divided font data based on the predetermined information; and
wherein the browsing control unit of the document browsing device executes restoration process of restoring the separated obfuscated registration font information to the registration font information based on the dummy information.

8. The non-transitory computer readable storage medium according to claim 7, wherein the obfuscated information in the delivery font file includes dummy information including a random character string.

9. The non-transitory computer readable storage medium according to claim 7, wherein the system further comprises an authentication device including:
a table storage unit storing a font table having, registered therein, font file information representing the font file, and restriction information representing whether there is a use restriction on the font or not, the font file information and the restriction information being stored in a state of being associated with each other; and
a use determination unit determining whether use of the font is permitted or not based on the font table;
wherein:
the authentication device is connected with the communication line;
the use determination unit executes:
a referring process of referring to the restriction information in the font table based on the font file information; and
a response process of, in the case where the restriction information indicates that there is no use restriction, transmitting permission information permitting the use of the font to the document browsing device; and
the browsing control unit of the document browsing device executes:
an inquiry process of inquiring of the authentication device whether there is a use restriction on the font or not based on the font file, and
the separation process and the combination process in the case where the permission information is acquired.

* * * * *